(12) United States Patent
Pellizzari et al.

(10) Patent No.: US 7,059,307 B2
(45) Date of Patent: Jun. 13, 2006

(54) FUEL INJECTOR FOR AN INTERNAL COMBUSTION ENGINE

(75) Inventors: Roberto O. Pellizzari, Groton, MA (US); John Baron, Lexington, MA (US); Jan-Roger Linna, Boston, MA (US); Peter Loftus, Cambridge, MA (US); Peter Palmer, Waltham, MA (US); John Paul Mello, Belmont, MA (US); Stuart Bennett Sprague, Somerville, MA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 10/870,634

(22) Filed: Jun. 17, 2004

(65) Prior Publication Data

US 2004/0226546 A1 Nov. 18, 2004

Related U.S. Application Data

(63) Continuation of application No. 10/143,250, filed on May 10, 2002, now Pat. No. 6,779,513.

(60) Provisional application No. 60/367,121, filed on Mar. 22, 2002.

(51) Int. Cl.
*F02M 51/00* (2006.01)
(52) U.S. Cl. ...................... 123/549; 123/557
(58) Field of Classification Search ........ 123/543–557, 123/198 A; 219/206–207; 239/5, 13, 86–136; 431/11–13, 121, 208–209
See application file for complete search history.

(56) References Cited

U.S. PATENT DOCUMENTS

| | | | |
|---|---|---|---|
| 3,716,416 A | | 2/1973 | Aldhart et al. |
| 3,868,939 A | * | 3/1975 | Friese et al. ............ 123/179.15 |
| 3,933,135 A | * | 1/1976 | Zillman et al. ............. 123/557 |
| 3,999,525 A | * | 12/1976 | Stumpp et al. ............. 123/557 |
| 4,013,396 A | | 3/1977 | Tenney |
| 4,344,404 A | | 8/1982 | Child et al. |

(Continued)

OTHER PUBLICATIONS

Boyle et al., "Cold Start Performance of an Automobile Engine Using Prevaporized Gasoine" SAE Technical Paper Series Society of Automotive Engineers, vol. 102, No. 3, pp. 949-9.

(Continued)

*Primary Examiner*—Marguerite McMahon
(74) *Attorney, Agent, or Firm*—Roberts, Mlotkowski & Hobbes

(57) ABSTRACT

A fuel injector for vaporizing a liquid fuel for use in an internal combustion engine. The fuel injector includes at least one capillary flow passage, the at least one capillary flow passage having an inlet end and an outlet end, a fluid control valve for placing the inlet end of the at least one capillary flow passage in fluid communication with the liquid fuel source and introducing the liquid fuel in a substantially liquid state, a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage and means for cleaning deposits formed during operation of the apparatus. The fuel injector is effective in reducing cold-start and warm-up emissions of an internal combustion engine. Efficient combustion is promoted by forming an aerosol of fine droplet size when the substantially vaporized fuel condenses in air.

23 Claims, 21 Drawing Sheets

U.S. PATENT DOCUMENTS

| | | |
|---|---|---|
| 4,472,133 A | 9/1984 | Petersen et al. |
| 4,986,248 A | 1/1991 | Kobayashi et al. |
| 5,127,822 A | 7/1992 | Nakayama et al. |
| 5,472,645 A | 12/1995 | Rock et al. |
| 5,482,023 A | 1/1996 | Hunt et al. |
| 5,692,095 A | 11/1997 | Young |
| 5,694,906 A | 12/1997 | Lange et al. |
| 5,743,251 A | 4/1998 | Howell et al. |
| 5,813,388 A | 9/1998 | Cikanek et al. |
| 5,870,525 A | 2/1999 | Young |
| 5,894,832 A * | 4/1999 | Nogi et al. ............... 123/491 |
| 6,095,436 A | 8/2000 | Seegers et al. |
| 6,102,687 A | 8/2000 | Butcher et al. |
| 6,155,268 A | 12/2000 | Takeuchi |
| 6,162,046 A | 12/2000 | Young et al. |
| 6,169,852 B1 | 1/2001 | Liao et al. |
| 6,189,803 B1 | 2/2001 | Ganan-Calvo |
| 6,192,596 B1 | 2/2001 | Bennett et al. |
| 6,195,504 B1 | 2/2001 | Horie et al. |
| 6,200,536 B1 | 3/2001 | Tonkovich et al. |
| 6,234,167 B1 | 5/2001 | Cox et al. |
| 6,276,347 B1 | 8/2001 | Hunt |
| 6,293,333 B1 | 9/2001 | Ponnappan et al. |
| 6,315,217 B1 | 11/2001 | Park |
| 6,390,076 B1 | 5/2002 | Hunt |
| 6,779,513 B1 * | 8/2004 | Pellizzari et al. ........... 123/549 |
| 6,871,792 B1 * | 3/2005 | Pellizzari ...................... 239/5 |

OTHER PUBLICATIONS

English abstract of JP 2000 110666.
English abstract of DE 19546851.
English abstract of EP 0,915,248.
English translation of EP 0,915,248.

* cited by examiner

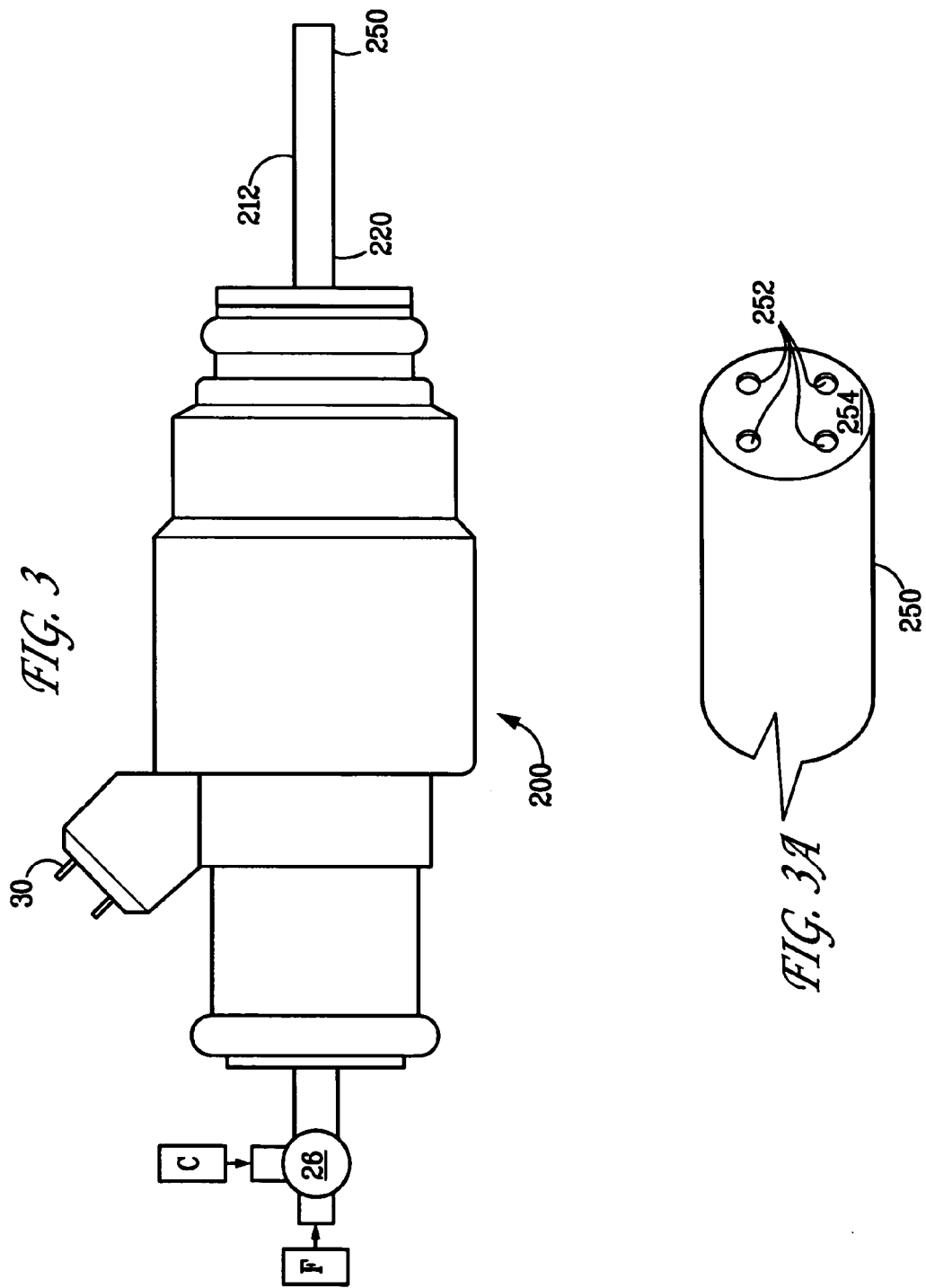

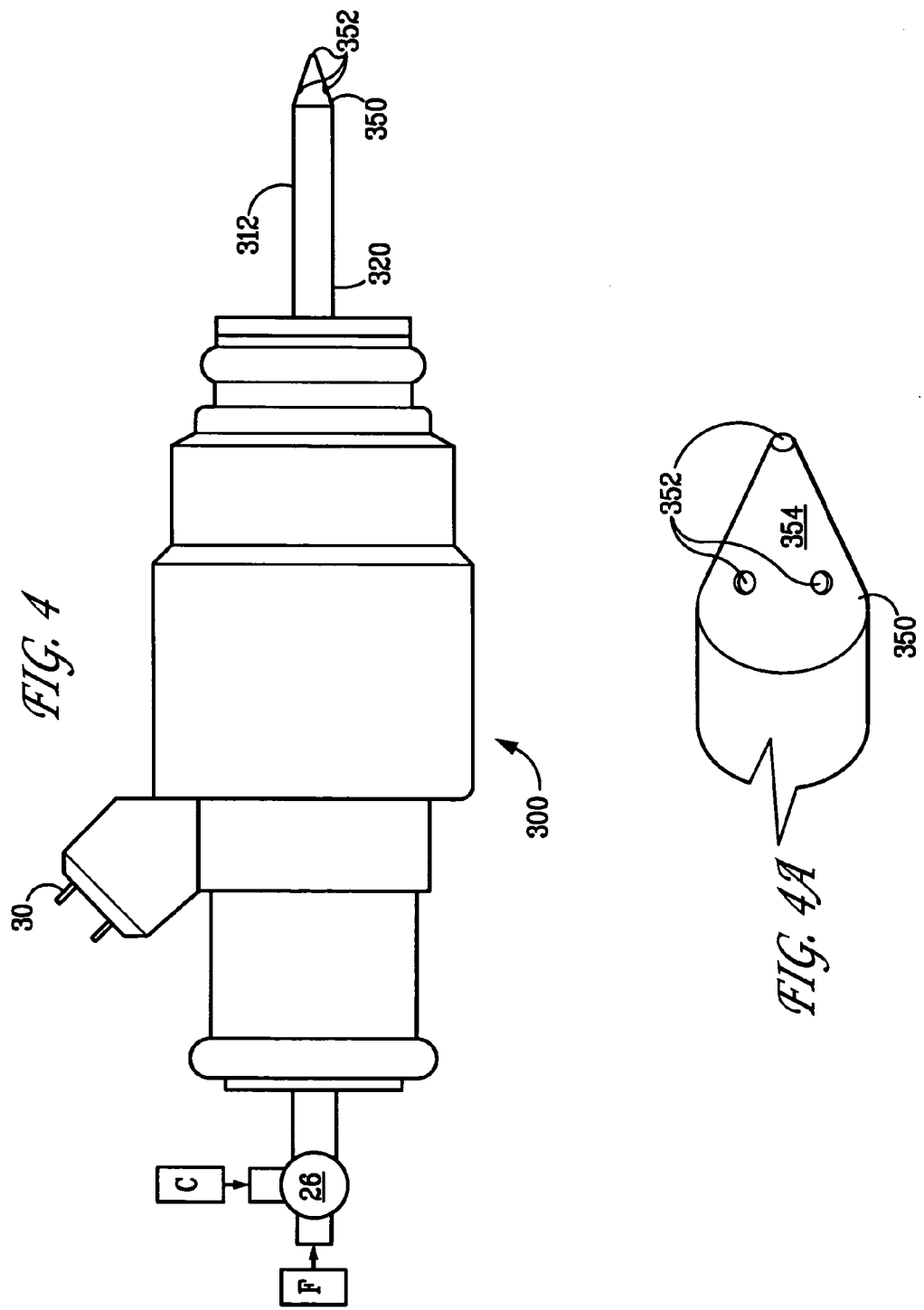

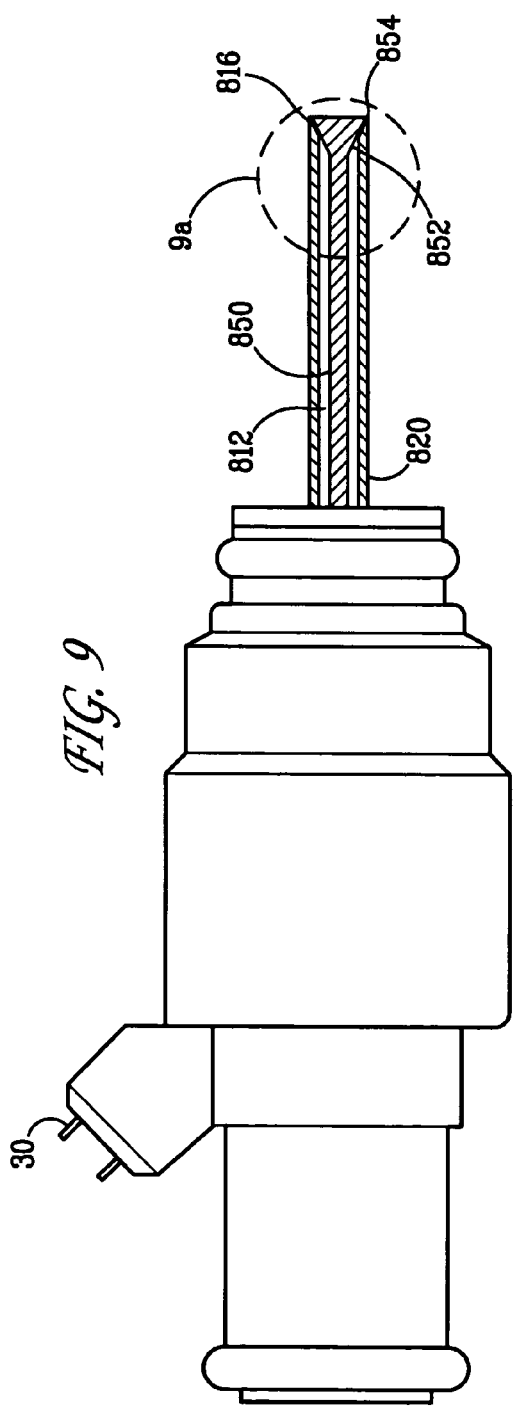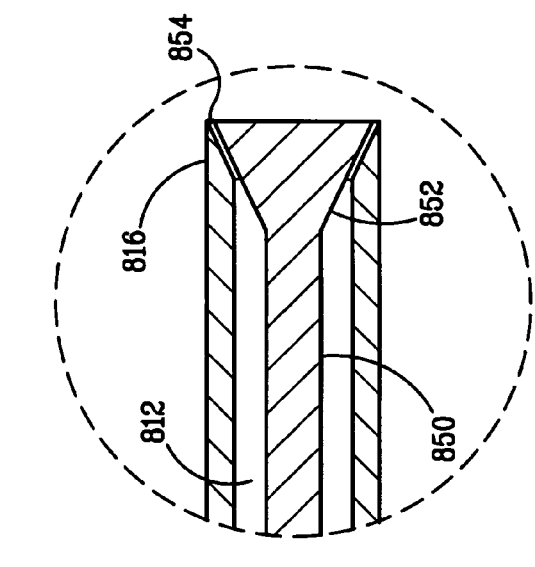
FIG. 9
FIG. 9A

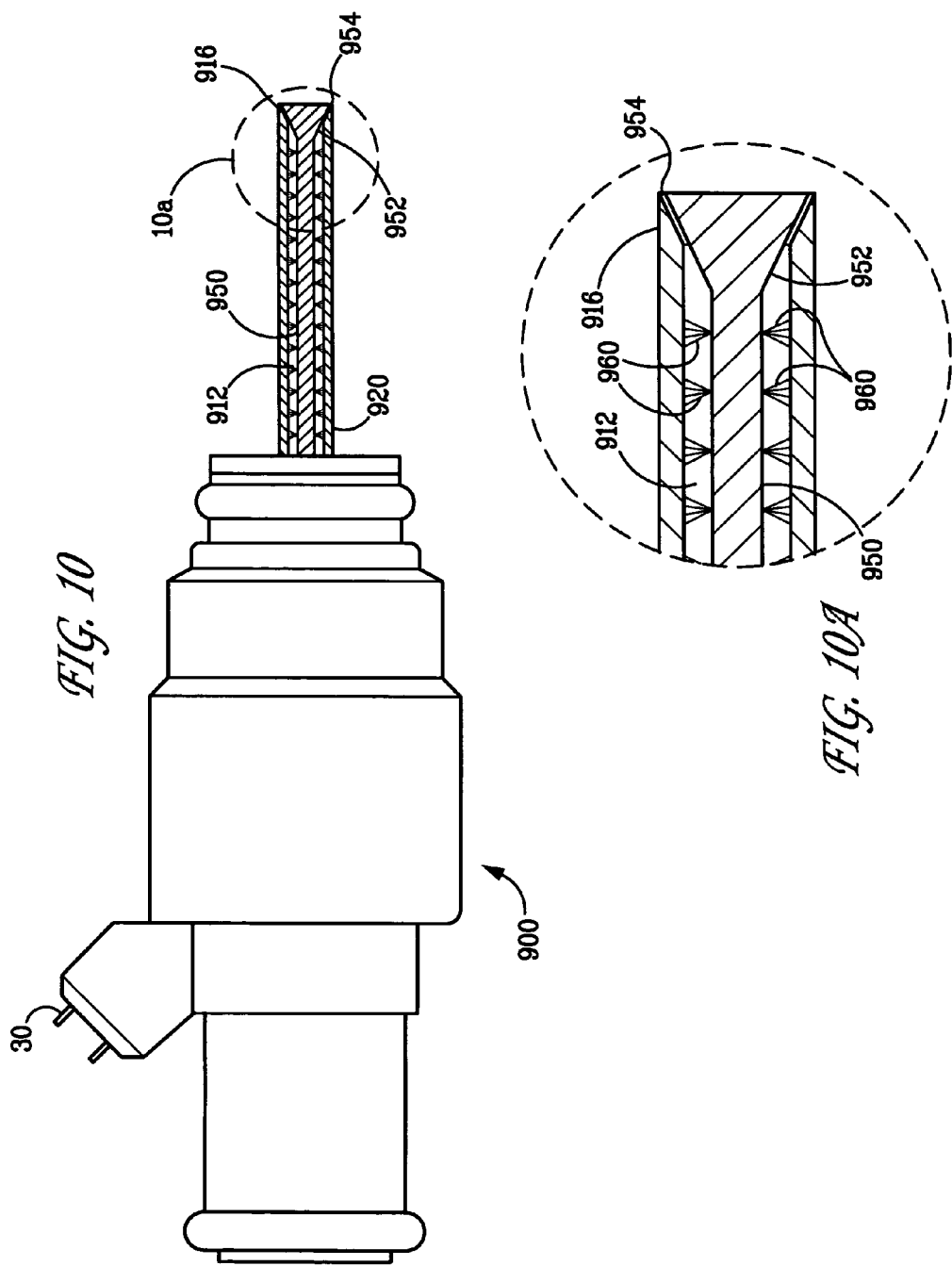

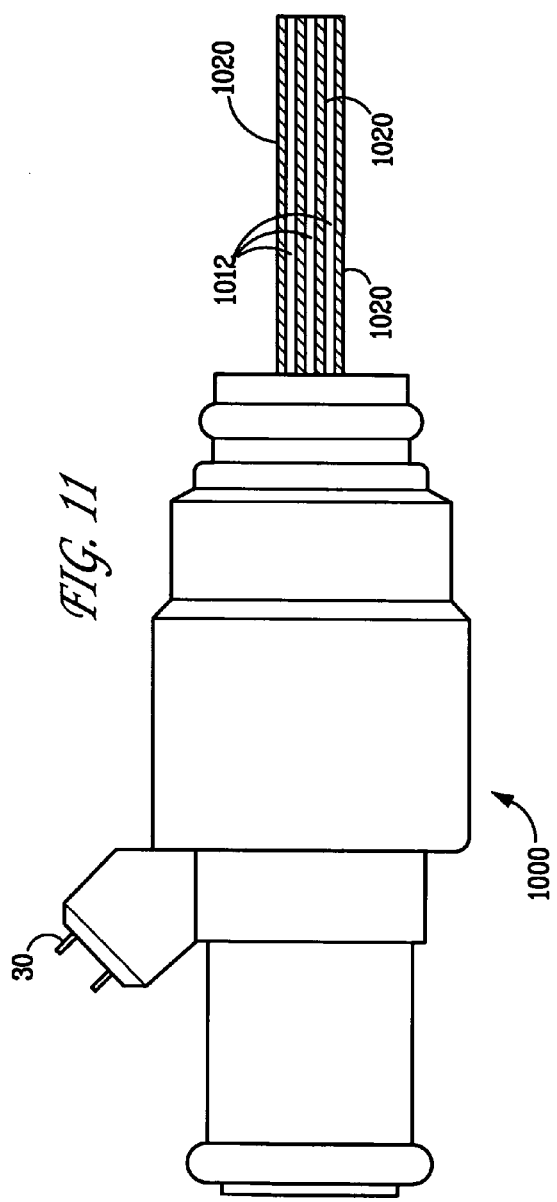
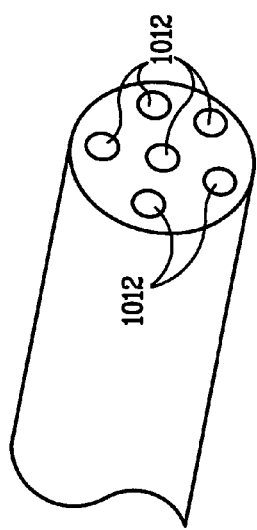
FIG. 11
FIG. 11A

FUEL INJECTOR FOR AN INTERNAL COMBUSTION ENGINE

RELATED APLICATIONS

This patent application is a continuation of application Ser. No. 10/143,250, filed on May 10, 2002, now U.S. Pat. No. 6,779,513 claims priority to Provisional Application Ser. No. 60/367,121, filed on Mar. 22, 2002, and is related to the following patent applications that are hereby incorporated by reference: "Method and Apparatus for Generating Power by Combustion of Vaporized Fuel;" by R. O. Pellizzari, filed on May 10, 2002; and "Apparatus and Method for Preparing and Delivering Fuel," by R. O. Pellizzari, filed on May 10, 2002.

FIELD

The present invention relates to fuel delivery in an internal combustion engine. More particularly, a method and apparatus according to the invention provides at least one heated capillary flow passage for vaporizing fuel supplied to an internal combustion engine.

BACKGROUND

A variety of systems have been devised to supply fine liquid fuel droplets and air to internal combustion engines. These systems either supply fuel directly into the combustion chamber (direct injection) or utilize a carburetor or fuel injector(s) to supply the mixture through an intake manifold into a combustion chamber (indirect injection). In currently employed systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold, under normal operating conditions. The liquid fuel films on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized to occur in less than one engine cycle.

Under most engine operating conditions, the temperature of the intake components is sufficient to rapidly vaporize the impinging liquid fuel droplets. However, under conditions such as cold-start and warm-up, the fuel is not vaporized through impingement on the relatively cold engine components. Instead, engine operation under these conditions is ensured by supplying excess fuel such that a sufficient fraction evaporates through heat and mass transfer as it travels through the air prior to impinging on a cold intake component. Evaporation rate through this mechanism is a function of fuel properties, temperature, pressure, relative droplet and air velocities and droplet diameter. Of course, this approach breaks down in extreme ambient cold-starts, in which the fuel volatility is insufficient to produce vapor in ignitable concentrations with air.

In order for combustion to be chemically complete, the fuel-air mixture must be vaporized to a stoichiometric gas-phase mixture. A stoichiometric combustible mixture contains the exact quantities of air (oxygen) and fuel required for complete combustion. For gasoline, this air-fuel ratio is about 14.7:1 by weight. A fuel-air mixture that is not completely vaporized, nor stoichiometric, results in incomplete combustion and reduced thermal efficiency. The products of an ideal combustion process are water ($H_2O$) and carbon dioxide ($CO_2$). If combustion is incomplete, some carbon is not fully oxidized, yielding carbon monoxide (CO) and unburned hydrocarbons (HC).

The mandate to reduce air pollution has resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

However, inefficient fuel preparation at lower engine temperatures remains a problem which results in higher emissions, requiring after-treatment and complex control strategies. Such control strategies can include exhaust gas recirculation, variable valve timing, retarded ignition timing, reduced compression ratios, the use of catalytic converters and air injection to oxidize unburned hydrocarbons and produce an exothermic reaction benefiting catalytic converter light-off.

Over-fueling the engine during cold-start and warm-up is a significant source of unburned hydrocarbon emissions in conventional engines. Compounding the problem is the fact that the catalytic converter is also cold during this period of operation and, thus, does not reduce a significant amount of the unburned hydrocarbons that pass through the engine exhaust. As a result, the high engine-out concentrations of unburned hydrocarbons pass essentially unreacted through the catalytic converter and are emitted from the tailpipe. It has been estimated that as much as 80 percent of the total hydrocarbon emissions produced by a typical, modern passenger car occurs during the cold-start and warm-up period, in which the engine is over-fueled and the catalytic converter is essentially inactive.

Given the relatively large proportion of unburned hydrocarbons emitted during startup, this aspect of passenger car engine operation has been the focus of significant technology development efforts. Furthermore, as increasingly stringent emissions standards are enacted into legislation and consumers remain sensitive to pricing and performance, these development efforts will continue to be paramount. Such efforts to reduce start-up emissions from conventional engines generally fall into two categories: 1) reducing the warm-up time for three-way catalyst systems and 2) improving techniques for fuel vaporization. Efforts to reduce the warm-up time for three-way catalysts to date have included: retarding the ignition timing to elevate the exhaust temperature; opening the exhaust valves prematurely; electrically heating the catalyst; burner or flame heating the catalyst; and catalytically heating the catalyst. As a whole, these efforts are costly and do not address HC emissions during and immediately after cold start.

A variety of techniques have been proposed to address the issue of fuel vaporization. U.S. patents proposing fuel vaporization techniques include U.S. Pat. No. 5,195,477 issued to Hudson, Jr. et al, U.S. Pat. No. 5,331,937 issued to Clarke, U.S. Pat. No. 4,886,032 issued to Asmus, U.S. Pat. No. 4,955,351 issued to Lewis et al., U.S. Pat. No. 4,458,655 issued to Oza, U.S. Pat. No. 6,189,518 issued to Cooke, U.S. Pat. No. 5,482,023 issued to Hunt, U.S. Pat. No. 6,109,247 issued to Hunt, U.S. Pat. No. 6,067,970 issued to Awarzamani et al., U.S. Pat. No. 5,947,091 issued to Krohn et al., U.S. Pat. No. 5,758,826 issued to Nines, U.S. Pat. No. 5,836,289 issued to Thring, and U.S. Pat. No. 5,813,388 issued to Cikanek, Jr. et al.

Other fuel delivery devices proposed include U.S. Pat. No. 3,716,416, which discloses a fuel-metering device for use in a fuel cell system. The fuel cell system is intended to be self-regulating, producing power at a predetermined level. The proposed fuel metering system includes a capillary flow control device for throttling the fuel flow in response to the power output of the fuel cell, rather than to provide improved fuel preparation for subsequent combustion. Instead, the fuel is intended to be fed to a fuel reformer for conversion to $H_2$ and then fed to a fuel cell. In a preferred embodiment, the capillary tubes are made of metal and the capillary itself is used as a resistor, which is in electrical contact with the power output of the fuel cell. Because the flow resistance of a vapor is greater than that of a liquid, the flow is throttled as the power output increases. The fuels suggested for use include any fluid that is easily transformed from a liquid to a vapor phase by applying heat and flows freely through a capillary. Vaporization appears to be achieved in the manner that vapor lock occurs in automotive engines.

U.S. Pat. No. 6,276,347 proposes a supercritical or near-supercritical atomizer and method for achieving atomization or vaporization of a liquid. The supercritical atomizer of U.S. Pat. No. 6,276,347 is said to enable the use of heavy fuels to fire small, light weight, low compression ratio, spark-ignition piston engines that typically burn gasoline. The atomizer is intended to create a spray of fine droplets from liquid, or liquid-like fuels, by moving the fuels toward their supercritical temperature and releasing the fuels into a region of lower pressure on the gas stability field in the phase diagram associated with the fuels, causing a fine atomization or vaporization of the fuel. Utility is disclosed for applications such as combustion engines, scientific equipment, chemical processing, waste disposal control, cleaning, etching, insect control, surface modification, humidification and vaporization.

To minimize decomposition, U.S. Pat. No. 6,276,347 proposes keeping the fuel below the supercritical temperature until passing the distal end of a restrictor for atomization. For certain applications, heating just the tip of the restrictor is desired to minimize the potential for chemical reactions or precipitations. This is said to reduce problems associated with impurities, reactants or materials in the fuel stream which otherwise tend to be driven out of solution, clogging lines and filters. Working at or near supercritical pressure suggests that the fuel supply system operate in the range of 300 to 800 psig. While the use of supercritical pressures and temperatures might reduce clogging of the atomizer, it appears to require the use of a relatively more expensive fuel pump, as well as fuel lines, fittings and the like that are capable of operating at these elevated pressures.

OBJECTS AND SUMMARY OF THE PREFERRED FORMS

One object is to provide a fuel injector having improved fuel vaporization characteristics under all engine operating conditions, particularly cold-start and warm-up conditions.

Another object is to provide a fuel injector capable of reducing the ignition energy requirements of an internal combustion engine.

It is a still further object to provide a fuel injector and delivery system capable of reducing emissions and improving fuel efficiency.

It is yet a further object to provide a fuel injector and delivery system that can supply vaporized fuel while requiring minimal power and warm-up time, without the need for a high pressure fuel supply system, which may be utilized in a number of configurations including conventional port-fuel injection, hybrid-electric, gasoline direct-injection, and alcohol-fueled engines.

These and other objects will become apparent from the detailed description of the preferred forms set out below and now summarized as follows:

A preferred form of the fuel injector for vaporizing a liquid fuel for use in an internal combustion engine is intended to accomplish at least one or more of the aforementioned objects. One such form includes at least one capillary flow passage, the at least one capillary flow passage having an inlet end and an outlet end, a fluid control valve for placing the inlet end of the at least one capillary flow passage in fluid communication with the liquid fuel source and introducing the liquid fuel in a substantially liquid state, a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage and means for cleaning deposits formed during operation of the apparatus. The fuel injector is effective in reducing cold-start and warm-up emissions of an internal combustion engine. Efficient combustion is promoted by forming an aerosol of fine droplet size when the substantially vaporized fuel condenses in air. The vaporized fuel can be supplied directly or indirectly to a combustion chamber of an internal combustion engine during cold-start and warm-up of the engine, or at other periods during the operation of the engine, and reduced emissions can be achieved due to capacity for improved mixture control during cold-start, warm-up and transient operation.

One preferred form also provides a method of delivering fuel to an internal combustion engine. The method includes the steps of supplying liquid fuel to at least one capillary flow passage of a fuel injector, causing a stream of substantially vaporized fuel to pass through an outlet of the at least one capillary flow passage by heating the liquid fuel in the at least one capillary flow passage; and delivering the vaporized fuel to a combustion chamber of the internal combustion engine.

Another preferred form provides a fuel system for use in an internal combustion engine, the fuel system including a plurality of fuel injectors, each injector including (i) at least one capillary flow passage, the at least one capillary flow passage having an inlet end and an outlet end, (ii) a fluid control valve for placing the inlet end of the at least one capillary flow passage in fluid communication with the liquid fuel source and introducing the liquid fuel in a substantially liquid state and (iii) a heat source arranged along the at least one capillary flow passage, the heat source operable to heat the liquid fuel in the at least one capillary flow passage to a level sufficient to change at least a portion thereof from the liquid state to a vapor state and deliver a stream of substantially vaporized fuel from the outlet end of the at least one capillary flow passage, a liquid fuel supply system in fluid communication with the plurality of fuel injectors and a controller to control the supply of fuel to the plurality of fuel injectors.

According to one preferred form, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol having a mean droplet size of 25 µm or less.

In another preferred form, the means for cleaning deposits includes an oxidizer control valve for placing the at least one capillary flow passage in fluid communication with an oxidizer, the heat source being operable to heat the oxidizer in the at least one capillary flow passage to a level sufficient to oxidize deposits formed during the heating of the liquid fuel. In this embodiment, the oxidizer control valve is operable to alternate between the introduction of liquid fuel and the introduction of oxidizer into the capillary flow passage and enable in-situ cleaning of the capillary flow passage when the oxidizer is introduced into the at least one capillary flow passage. The oxidizer is preferably selected from the group of air, exhaust gas, steam and mixtures thereof.

In yet another preferred form, the means for cleaning deposits includes means for abrading deposits formed during operation of the apparatus. The means for abrading deposits can include cleaning brushes disposed along a valve stem positioned within the capillary passage.

In another preferred form, the means for cleaning deposits can include a solvent control valve for placing the at least one capillary flow passage in fluid communication with a solvent. In this preferred form, the solvent control valve alternates between the introduction of liquid fuel and the introduction of solvent into the capillary flow passage and enables in-situ cleaning of the capillary flow passage when the solvent is introduced into the at least one capillary flow passage.

BRIEF DESCRIPTION OF THE DRAWINGS

The invention will now be described in more detail with reference to preferred forms of the invention, given only by way of example, and with reference to the accompanying drawings, in which:

FIG. 3 is a side elevation view of another embodiment of a fuel injector according to another preferred form;

FIG. 3A is an isometric view of another outlet design of the capillary of the embodiment illustrated in FIG. 3;

FIG. 4 is a side elevation view of yet another embodiment of a fuel injector according to a preferred form;

FIG. 4A is an isometric view of another outlet design of the capillary of the embodiment illustrated in FIG. 4;

FIG. 9 is a side view of another embodiment of a fuel injector according to a preferred form shown in partial cross-section;

FIG. 9A is an enlarged view of an identified portion of the embodiment shown in FIG. 9;

FIG. 10 is a side view of another embodiment of a fuel injector according to a preferred form, shown in partial cross-section;

FIG. 10A is an enlarged view of an identified portion of the embodiment shown in FIG. 10;

FIG. 11 is a side elevation view of yet another preferred form of a fuel injector in accordance herewith;

FIG. 11A is an isometric view of another outlet design of the capillary of the embodiment illustrated in FIG. 11;

DETAILED DESCRIPTION OF THE PREFERRED EMBODIMENTS

Figure 1:
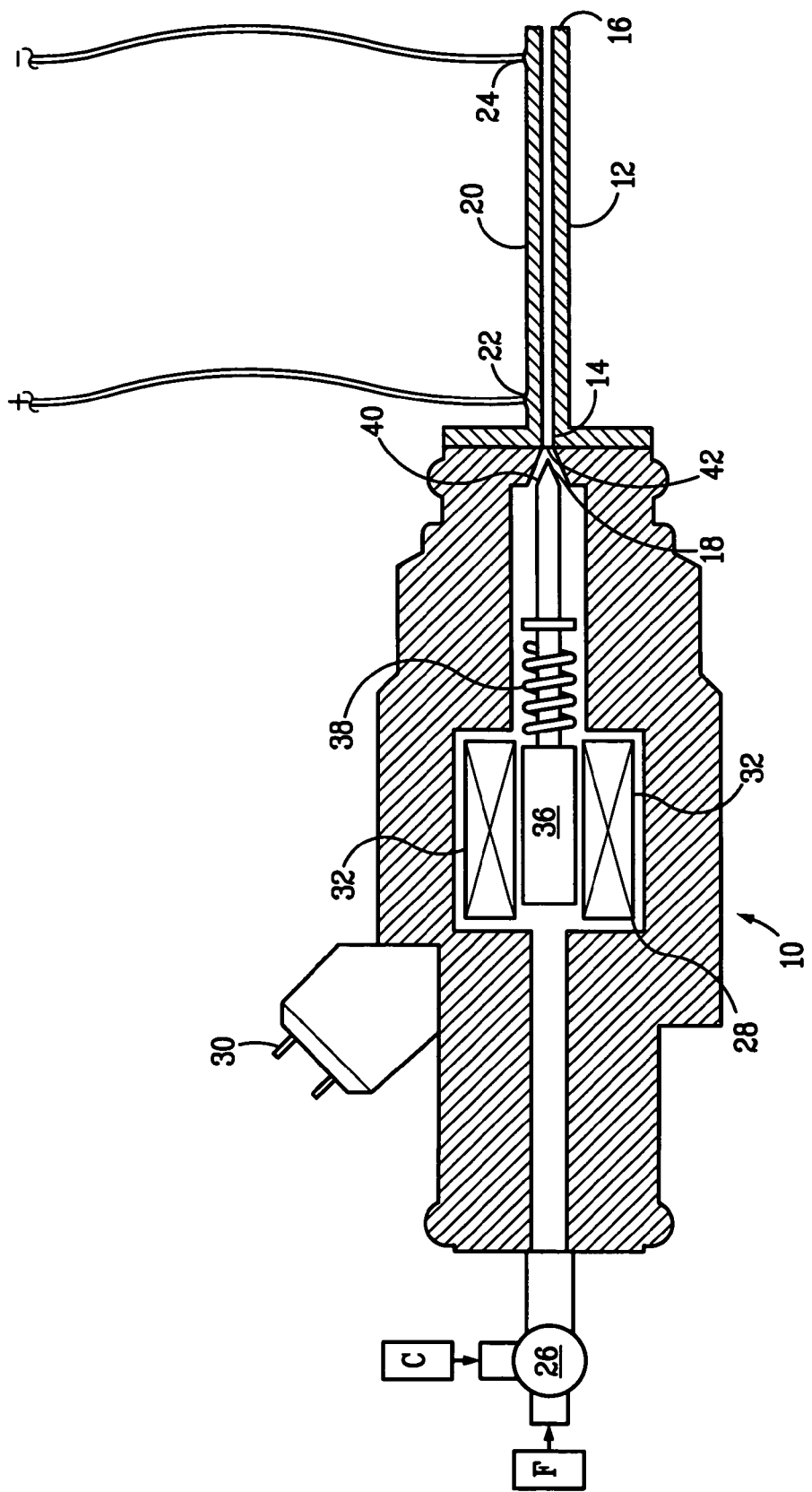
FIG. 1 illustrates a modified fuel injector, in partial cross section, which includes a capillary flow passage in accordance with a preferred form.

Reference is now made to the embodiments illustrated in FIGS. 1–21 wherein like numerals are used to designate like parts throughout.

The present invention provides a fuel preparation and delivery useful for cold-start, warm-up and normal operation of an internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel delivery system of the present invention requires less power, and has shorter warm-up times than other vaporization techniques.

In general, gasolines do not readily vaporize at low temperatures. During the cold start and warm-up period, relatively little vaporization of the liquid fuel takes place. As such, it is necessary to provide an excess of liquid fuel to each cylinder of the engine in order to achieve an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, the liquid fuel readily vaporizes, so that less fuel is needed to achieve an air/fuel mixture that will readily combust. Advantageously, upon reaching normal operating temperature, the air/fuel mixture can be controlled at or near stoichiometry, thereby reducing emissions of unburned hydrocarbons and carbon monoxide. Additionally, when fueling is controlled at or near stoichiometry, just enough air is available in the exhaust stream for simultaneous oxidation of unburned hydrocarbons and carbon monoxide and reduction of nitrogen oxides over a three-way catalyst (TWC).

The system and method of the present invention injects fuel that has been substantially vaporized into the intake flow passage, or directly into an engine cylinder, thereby eliminating the need for excess fuel during the start-up and warm-up period of an engine. The fuel is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough air to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream which can react over the catalyst surface once the catalyst reaches its light-off temperature. In contrast, the system and method of the present invention enables the engine to operate at stoichiometric or even slightly fuel-lean conditions during the cold-start and warm-up period, eliminating both the need for over-fueling and the need for an additional exhaust air pump, reducing the cost and complexity of the exhaust after treatment system.

As mentioned, during the cold start and warm-up period, the three-way catalyst is initially cold and is not able to reduce a significant amount of the unburned hydrocarbons that pass through the catalyst. Much effort has been devoted to reducing the warm-up time for three-way catalysts, so as to convert a larger fraction of the unburned hydrocarbons emitted during the cold-start and warm-up period. One such concept is to deliberately operate the engine very fuel-rich during the cold-start and warm-up period. Using an exhaust air-pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

The system and method of the present invention may also be utilized with gasoline direct injection engines (GDI). In GDI engines, the fuel is injected directly into the cylinder as a finely atomized spray that evaporates and mixes with air to form a premixed charge of air and vaporized fuel prior to ignition. Contemporary GDI engines require high fuel pressures to atomize the fuel spray. GDI engines operate with stratified charge at part load to reduce the pumping losses inherent in conventional indirect injected engines. A stratified-charge, spark-ignited engine has the potential for burning lean mixtures for improved fuel economy and reduced emissions. Preferably an overall lean mixture is formed in the combustion chamber, but is controlled to be stoichiometric or slightly fuel-rich in the vicinity of the spark plug at the time of ignition. The stoichiometric portion is thus easily ignited, and this in turn ignites the remaining lean mixture. While pumping losses can be reduced, the operating window currently achievable for stratified charge is limited to low engine speeds and relatively light engine loads. The limiting factors include insufficient time for vaporization and mixing at higher engine speeds and insufficient mixing or poor air utilization at higher loads. By providing vaporized fuel, the system and method of the present invention can widen the operating window for stratified charge operation, solving the problem associated with insufficient time for vaporization and mixing. Advantageously, unlike conventional GDI fuel systems, the fuel pressure employed in the practice of the present invention can be lowered, reducing the overall cost and complexity of the fuel system.

The invention provides a fuel delivery device for an internal combustion engine which includes a pressurized liquid fuel supply that supplies liquid fuel under pressure, at least one capillary flow passage connected to the liquid fuel supply, and a heat source arranged along the at least one capillary flow passage. The heat source is operable to heat liquid fuel in the at least one capillary flow passage sufficiently to deliver a stream of substantially vaporized fuel. The fuel delivery device is preferably operated to deliver the stream of vaporized fuel to one or more combustion chambers of an internal combustion engine during start-up, warm-up, and other operating conditions of the internal combustion engine. If desired, the at least one capillary flow passage can be used to deliver liquid fuel to the engine under normal operating conditions.

The invention also provides a method of delivering fuel to an internal combustion engine, including the steps of supplying the pressurized liquid fuel to at least one capillary flow passage, and heating the pressurized liquid fuel in the at least one capillary flow passage sufficiently to cause a stream of vaporized fuel to be delivered to at least one combustion chamber of an internal combustion engine during start-up, warm-up, and other operating conditions of the internal combustion engine.

A fuel delivery system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid fuel that enters the flow passage being converted to a vapor as it travels along the passageway. The fuel exits the capillary passageway as a vapor, which optionally contains a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel reaches the boiling point during heating in the capillary flow passage, some of the liquid fuel may not be heated enough to be fully vaporized with the result that a portion of the liquid fuel passes through the outlet of the capillary flow passage along with the vaporized fluid.

The capillary-sized fluid passage is preferably formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage which can be $8 \times 10^{-5}$ to 7 mm$^2$, preferably $8 \times 10^{-3}$ to $8 \times 10^{-1}$ mm$^2$ and more preferably $2 \times 10^{-3}$ to $2 \times 10^{-1}$ mm$^2$. Many combinations of a single or multiple capillaries, various pressures, various capillary lengths, amounts of heat applied to the capillary, and different cross-sectional areas will suit a given application.

The liquid fuel can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100–200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine. The low thermal inertia also could provide advantages during normal operation of the engine, such as by improving the responsiveness of the fuel delivery to sudden changes in engine power demands.

During vaporization of liquid fuel in a heated capillary passage, deposits of carbon and/or heavy hydrocarbons can accumulate on the capillary walls and the flow of the fuel can be severely restricted which ultimately can lead to clogging of the capillary flow passage. The rate at which these deposits accumulate is a function of capillary wall temperature, fuel flow rate and fuel type. It is believed that fuel additives may be useful in reducing such deposits. However, should clogging develop, such clogging can be cleared by oxidizing the deposits.

FIG. 1 presents a fuel injector 10 for vaporizing a liquid fuel drawn from a source of liquid fuel, in accordance with the present invention. Apparatus 10 includes a capillary flow passage 12, having an inlet end 14 and an outlet end 16. A fluid control valve 18 is provided for placing inlet end 14 of capillary flow passage 12 in fluid communication with a liquid fuel source F and introducing the liquid fuel in a substantially liquid state into capillary flow passage 12.

As is preferred, fluid control valve 18 may be operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A pintle 40 is connected to the solenoid element 36. Movement of the solenoid element 36, caused by applying electricity to the coil windings 32, causes the pintle to be drawn away from a orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from a liquid state to a vapor state and deliver a stream of substantially vaporized fuel from outlet end 16 of capillary flow passage 12.

Apparatus 10 also includes means for cleaning deposits formed during operation of apparatus 10. The means for cleaning deposits shown in FIG. 1 includes fluid control valve 18, heat source 20 and an oxidizer control valve 26 for placing capillary flow passage 12 in fluid communication with a source of oxidizer C. As may be appreciated, the oxidizer control valve can be located at or near either end of capillary flow passage 12 or configured to be in fluid communication with either end of capillary flow passage 12. If the oxidizer control valve is located at or near the outlet end 16 of capillary flow passage 12, it then serves to place the source of oxidizer C in fluid communication with the outlet end 16 of capillary flow passage 12. In operation, heat source 20 is used to heat the oxidizer C in capillary flow passage 12 to a level sufficient to oxidize deposits formed during the heating of the liquid fuel F. In one embodiment, to switch from a fueling mode to a cleaning mode, the oxidizer control valve 26 is operable to alternate between the introduction of liquid fuel F and the introduction of oxidizer C into capillary flow passage 12 and enable in-situ cleaning of capillary flow passage 12 when the oxidizer is introduced into the at least one capillary flow passage.

One technique for oxidizing deposits includes passing air or steam through the capillary. The flow passage is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel delivery system, more than one capillary flow passage can be used such that when a clogged condition is detected, such as by the use of a sensor, fuel flow can be diverted to another capillary flow passage and oxidant flow initiated through the clogged capillary flow passage to be cleaned. As an example, a capillary body can include a plurality of capillary flow passages therein and a valving arrangement can be provided to selectively supply liquid fuel or air to each flow passage.

Alternatively, fuel flow can be diverted from a capillary flow passage and oxidant flow initiated at preset intervals. Fuel delivery to a capillary flow passage can be effected by a controller. For example, the controller can activate fuel delivery for a preset time period and deactivate fuel delivery after the preset amount of time. The controller may also effect adjustment of the pressure of the liquid fuel and/or the amount of heat supplied to the capillary flow passage based on one or more sensed conditions. The sensed conditions may include inter alia: the fuel pressure; the capillary temperature; and the air fuel mixture. The controller may also control multiple fuel delivery devices attached to the application. The controller may also control one or more capillary flow passages to clear deposits or clogs therefrom. For example, cleaning of a capillary flow passage can be achieved by applying heat to the capillary flow passage and supplying a flow of an oxidant source to the capillary flow passage.

The heated capillary flow passage 12, in accordance with the invention can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 150 to 200 μm Sauter Mean Diameter (SMD), the aerosol has an average droplet size of less than 25 μm SMD, preferably less than 15 μm SMD. Thus, the majority of the fuel droplets produced by the heated capillary according to the invention can be carried by an air stream, regardless of the flow path, into the combustion chamber.

The difference between the droplet size distributions of a conventional injector and the heated capillary flow passage according to the invention is particularly critical during cold-start and warm-up conditions. Specifically, using a conventional port-fuel injector, relatively cold intake manifold components necessitate over-fueling such that a sufficient fraction of the large fuel droplets, impinging on the intake components, are vaporized to produce an ignitable fuel/air mixture. Conversely, the vaporized fuel and fine droplets produced by the fuel injector of the present invention are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector of the present invention results in greatly reduced cold start emissions compared to those produced by engines employing conventional fuel injector systems. In addition to a reduction in over-fueling, it should also be noted that the heated capillary injector according to the invention further enables fuel-lean operation during cold-start and warm-up, which results in a greater reduction in tailpipe emissions while the catalytic converter warms up.

Referring still to FIG. 1, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.020 to 0.030 inches, a heated length of approximately 2 to 10 inches, and fuel can be supplied to the tube 12 at a pressure of less than 100 psig, preferably less than 70 psig, more preferably less than 60 psig and even more preferably less than 45 psig or less. It has been shown that this embodiment produces vaporized fuel which forms a distribution of aerosol droplets which mostly range in size from 2 to 30 μm SMD with an average droplet size of about 5 to 15 μm SMD, when the vaporized fuel is condensed in air at ambient temperature. The preferred size of fuel droplets to achieve rapid and nearly complete vaporization at cold-starting temperatures is less than about 25 μm. This result can be achieved by applying approximately 100 to 400W, e.g., 200W of electrical power, which corresponds to 2–3% of the energy content of the vaporized fuel, to a six-inch stainless steel capillary tube. The electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. Electrical leads can be connected to the electrically conductive material to supply the electrical current to the heater so as to heat the tube along its length. Alternatives for heating the tube along its length could include inductive heating, such as by an electrical coil positioned around the flow passage, or other sources of heat positioned relative to the flow passage to heat the length of the flow passage through one or a combination of conductive, convective or radiative heat transfer.

Although, a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches. After cold-start and warm-up, it is not necessary to heat the capillary tube such that the unheated capillary tube can be used to supply adequate liquid fuel to an engine operating at normal temperature.

The vaporized fuel exiting from the fuel capillary according to the invention can be injected into an engine intake manifold at the same location as existing port-fuel injectors or at another location along the intake manifold. If desired, however, the fuel capillary can be arranged to deliver vaporized fuel directly into each cylinder of the engine. The fuel capillary provides advantages over systems that produce larger droplets of fuel that must be injected against the back side of a closed intake valve while starting the engine.

Preferably, the outlet of the fuel capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated using conventional fuel injectors, for normal engine operation. Normal engine operation can alternatively be performed by liquid fuel injection through an unheated capillary flow passage 12 via continuous injection or possibly pulsed injection.

Figure 2:
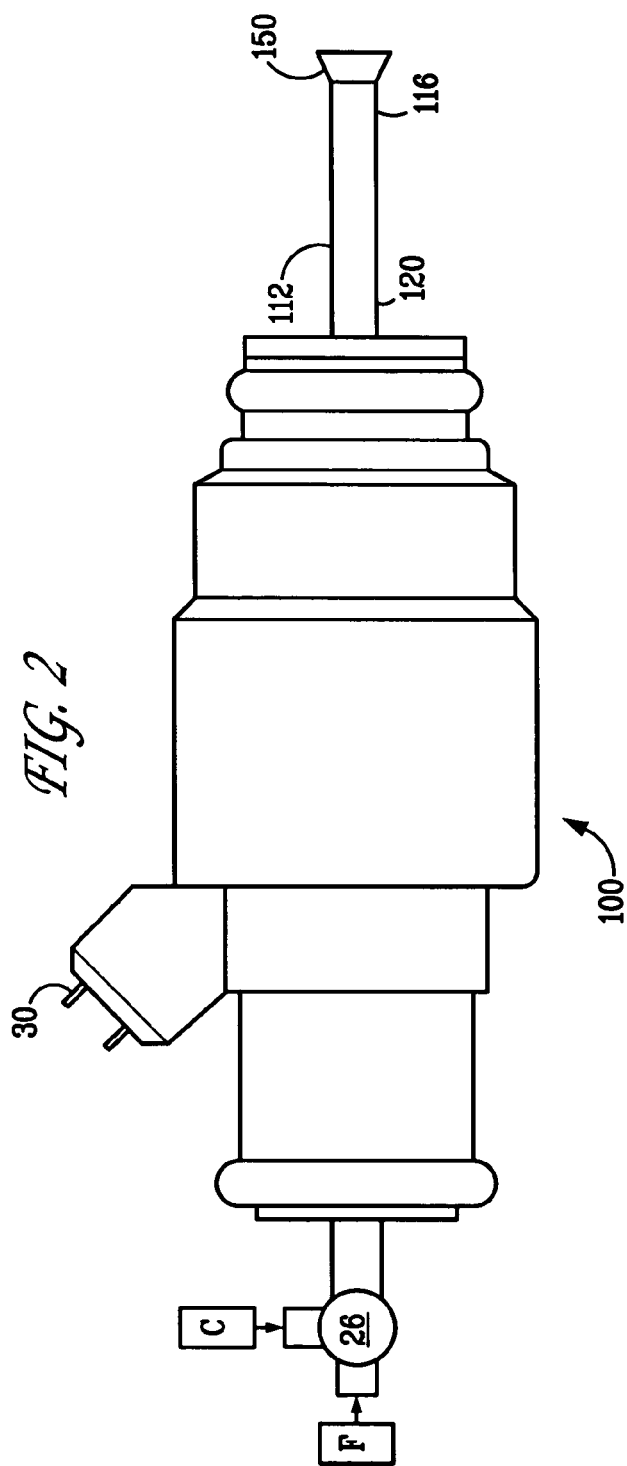
FIG. 2 is a side elevation view of an embodiment of the fuel injector according to another preferred form.
Figure 2A:
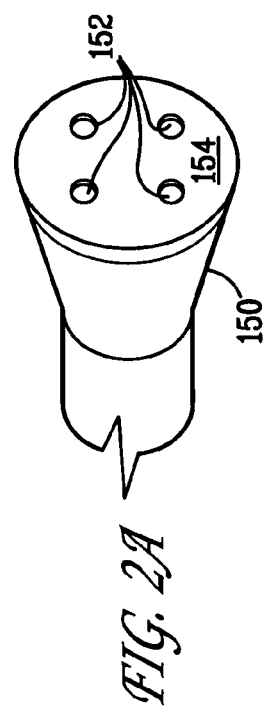
FIG. 2A is an isometric view of an outlet of the capillary of the embodiment illustrated in FIG. 2.

Referring to FIG. 2, a second exemplary embodiment of the present invention is shown. A fuel injector 100 has a capillary flow passage 112. Capillary flow passage 112 is heated along heated length 120, defined by electrical connections in a manner similar to that as shown in FIG. 1. The capillary flow passage 112 is fitted with a flared end 150 with a plurality of perforations 152 in a plate 154 covering the flared end 150 as illustrated by FIG. 2A. The fuel injector 100 can include a fluid control valve such as a solenoid valve of the type described above and shown in FIG. 1, which allows delivery of pressurized liquid fuel to the capillary flow passage 112. After the engine is sufficiently warmed, heating of the capillary flow passage 112 can be terminated and liquid fuel can be supplied through the capillary flow passage 112.

Referring now to FIG. 3, a third exemplary embodiment of the present invention is shown. A fuel injector 200 is depicted having a capillary flow passage 212. Capillary flow passage 212 is heated along heated length 220, defined by electrical connections in a manner similar to that as shown in FIG. 1. The capillary flow passage 212 is fitted with a flat end 250 with a plurality of perforations 252 in a plate 254 covering the flat end 250 as illustrated by FIG. 3A. The fuel injector 200 can include a fluid control valve such as a solenoid valve of the type described above and shown in FIG. 1, which allows delivery of pressurized liquid fuel to the capillary flow passage 212. As described above, after an engine utilizing a plurality of fuel injectors 200 is sufficiently warmed, heating of the capillary flow passage 212 can be terminated and liquid fuel can be supplied through the capillary flow passage 212. Injector 200 can advantageously be cleaned through the use of the oxidation technique described above.

Referring now to FIG. 4, a fourth exemplary embodiment of the present invention is shown. A fuel injector 300 is depicted having a capillary flow passage 312. Capillary flow passage 312 is heated along heated length 320, defined by electrical connections in a manner similar to that as shown in FIG. 1. The capillary flow passage 312 is fitted with a conical end 350 with a plurality of perforations 352 in a conical plate 354 covering the conical end 350 as illustrated by FIG. 4A. The fuel injector 300 can include a fluid control valve such as a solenoid valve of the type described above and shown in FIG. 1, which allows delivery of pressurized liquid fuel to the capillary flow passage 312. As described above, after an engine utilizing a plurality of fuel injectors 300 is sufficiently warmed, heating of the capillary flow passage 312 can be terminated and liquid fuel can be supplied through the capillary flow passage 212. Injector 300 can advantageously be cleaned through the use of the oxidation technique described above.

Figure 5:
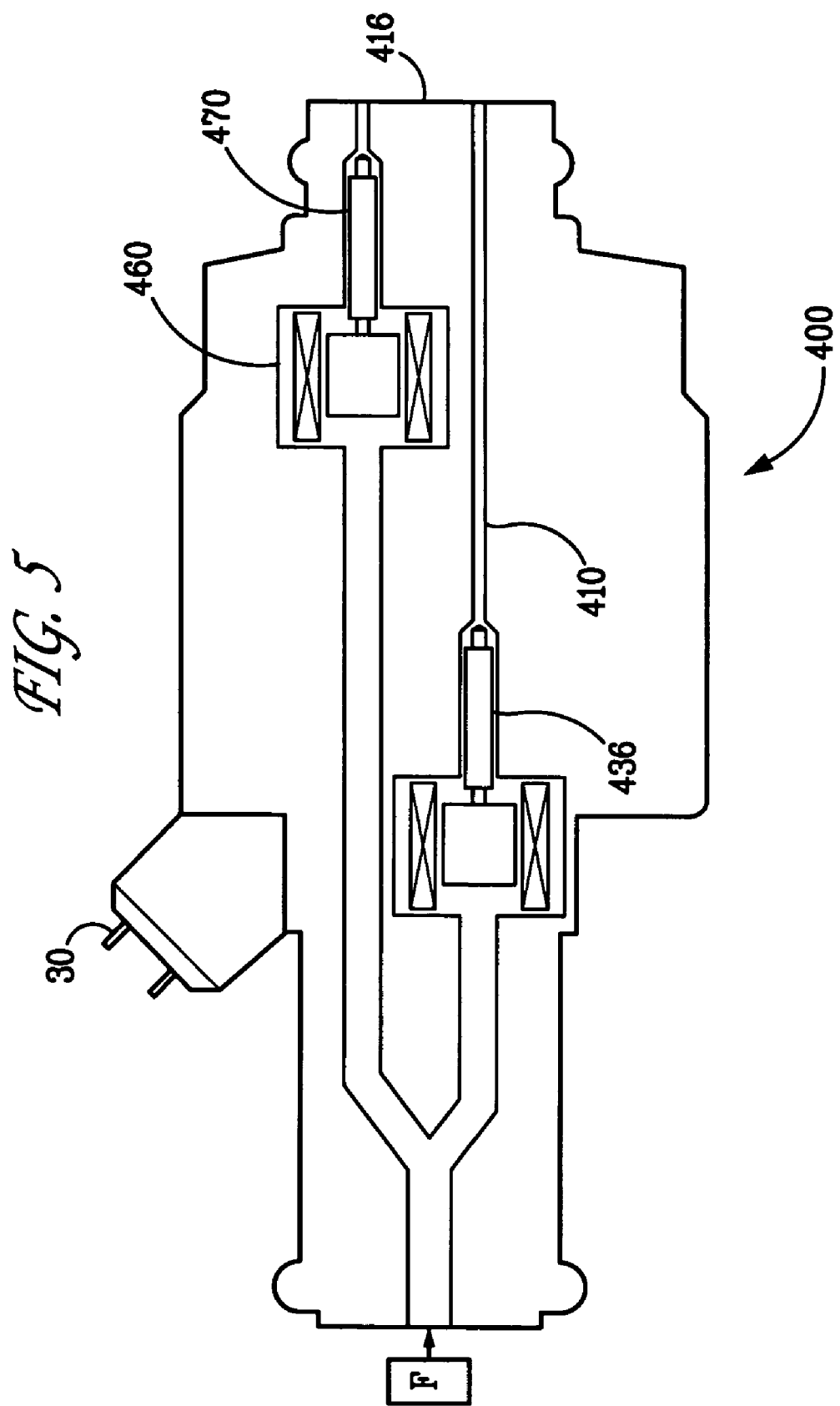
FIG. 5 is a schematic illustration of still another embodiment of a fuel injector according to a preferred form.

Referring now to FIG. 5, a dual fuel injector 400, in accordance with the present invention, is shown. FIG. 5 illustrates the dual function fuel injector 400 which may comprise a conventional type fuel injector 460 and a heated capillary injector 410. In this embodiment, a heated capillary flow passage 412 is integrated into the fuel injector 400. After about 20 seconds from starting the engine, or preferably less, the capillary injector 410 can be deactivated via a solenoid activated plunger 436 and the conventional injector 460 activated via another solenoid-activated plunger 470 for continued operation of the engine.

Figure 6:
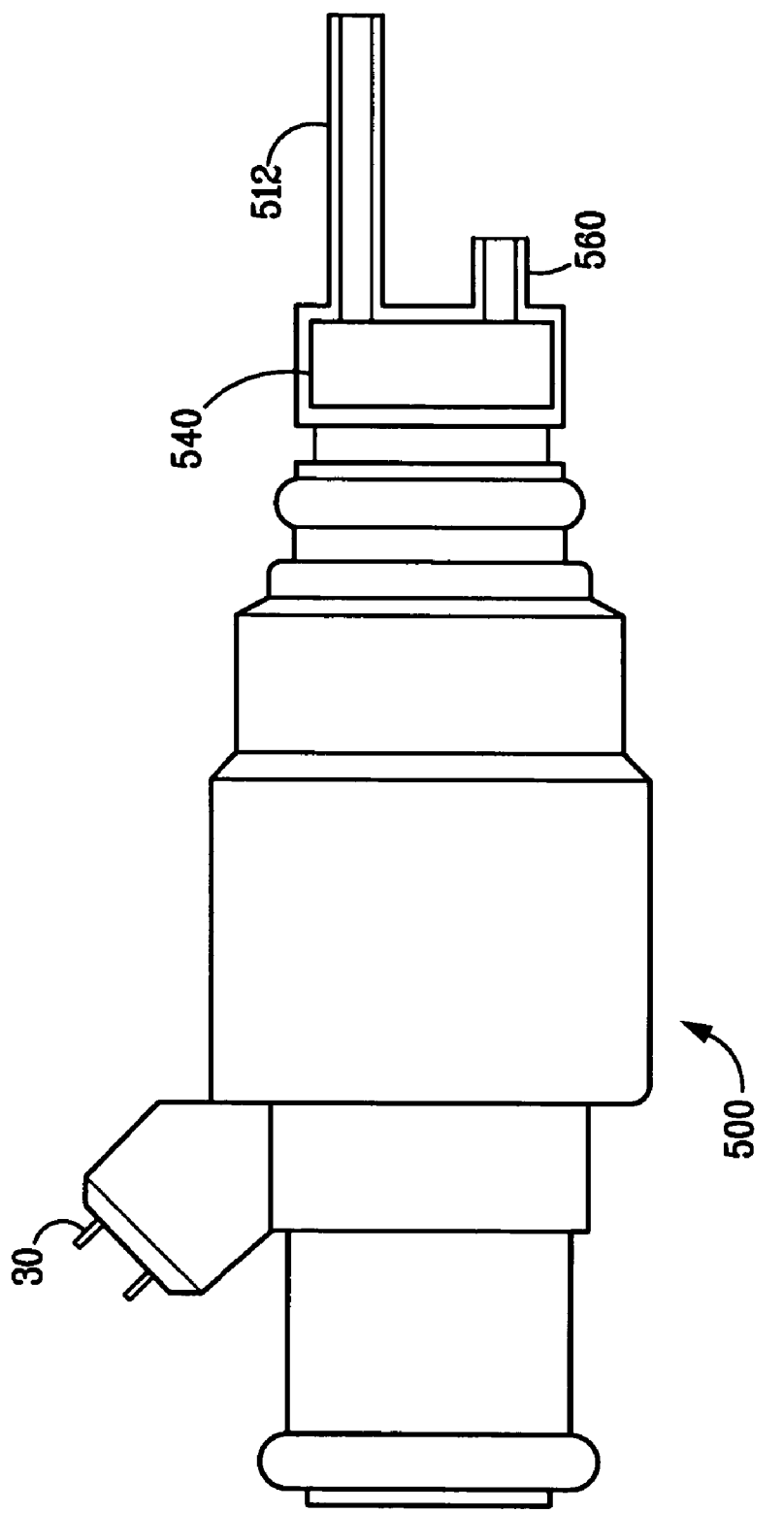
FIG. 6 is a side view of yet still another embodiment of a fuel injector according to a preferred form.

Another exemplary embodiment of the present invention is shown in FIG. 6. As shown, a fuel injector 500 may be fitted with a heated capillary flow passage 512 and a liquid fuel injector nozzle 560. Fuel flow can be selectively directed to the heated capillary flow passage 512 to provide vaporized fuel or the nozzle 560 to provide liquid fuel through the use of valving arrangement 540, as shown in FIG. 6. After approximately 20 seconds from the start of the engine, or preferably less, fuel flow can be switched from the capillary flow passage 512 to the liquid flow nozzle 560 by the valving arrangement 540 for normal operation of the engine. The valving arrangement 540 can be operated by a controller, forming part of an electronic engine control system.

Figure 7:
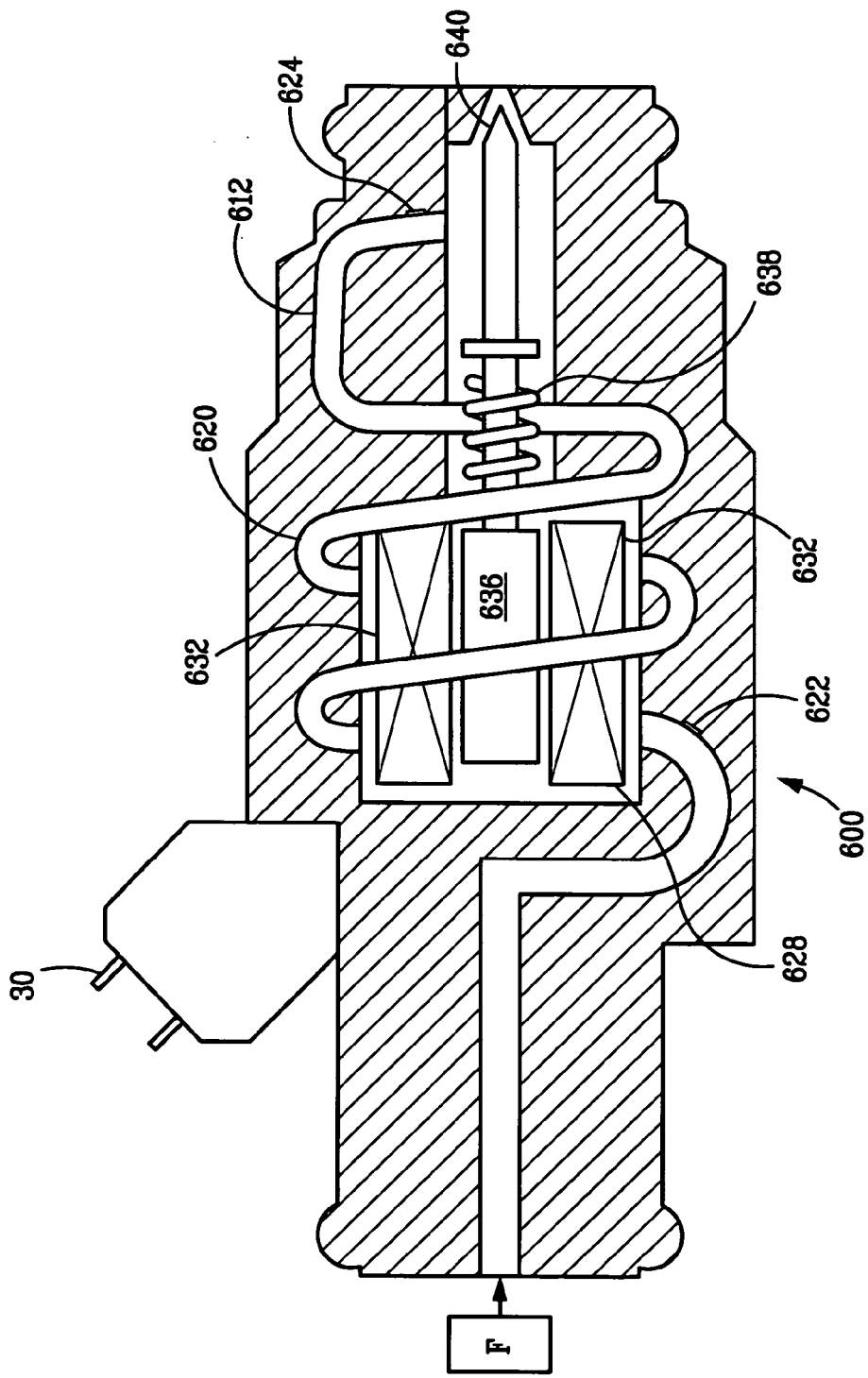
FIG. 7 is a cross-sectional view of another embodiment of the fuel injector according to yet another preferred form.

Referring now to FIG. 7, yet another exemplary embodiment of the present invention is shown. A fuel injector 600 has a helical heated capillary flow passage 612 which is wrapped around within the interior of the fuel injector 600 as illustrated in FIG. 7. In this embodiment, the capillary flow passage 612 is coiled around the solenoid assembly 628 and is heated along heated length 620, defined by electrical connections 622 and 624. This embodiment is useful in a situation where space is limited and a linear capillary tube is not feasible. In addition, this embodiment could be adapted for use with a conventional fuel injector (see FIG. 8) for delivering fuel to an engine during normal operating conditions.

Figure 8:
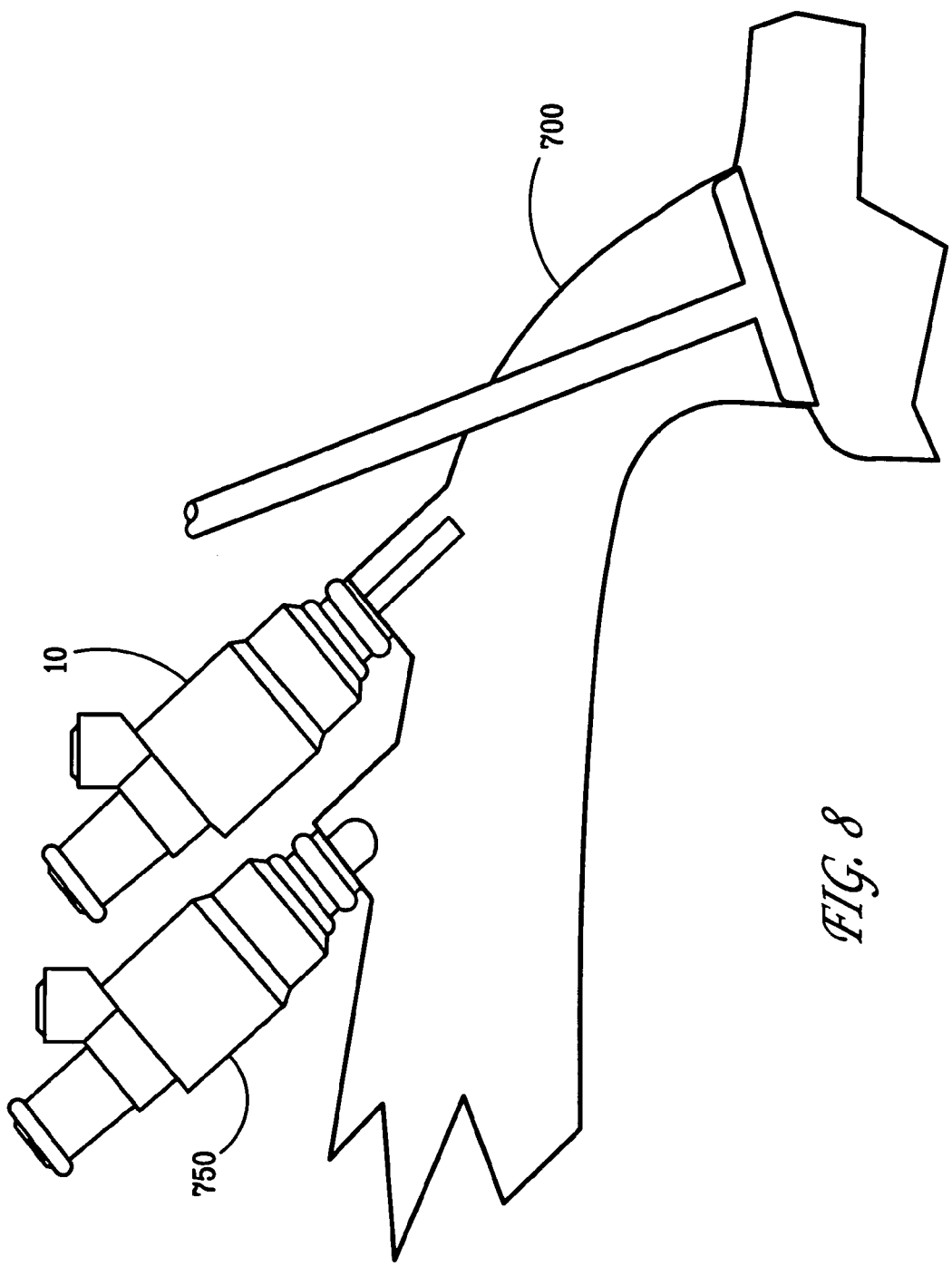
FIG. 8 is a side view of another embodiment employing dual injectors in accordance with still another preferred form.

Referring now to FIG. 8, an engine intake port 700 is fitted with a heated capillary injector 10 (of the type described with reference to FIG. 1) and a conventional liquid fuel injector 750. In this embodiment, fuel will be delivered to the engine by the capillary flow passage 12, heated along its length 20, during the cold-start and warm-up of the engine. After the first approximately 20 seconds from starting the engine, or preferably less, the heated capillary injector 10 will be deactivated and the conventional fuel injector 750 activated for normal operation of the engine.

As will be appreciated, the apparatus and system for preparing and delivering fuel depicted in FIGS. 1 through 4 and 7 may also be used in connection with another embodiment of the present invention. Referring again to FIG. 1, the means for cleaning deposits includes fluid control valve 18, a solvent control valve 26 for placing capillary flow passage 12 in fluid communication with a solvent, solvent control valve 26 disposed at one end of capillary flow passage 12. In one embodiment of the apparatus employing solvent cleaning, the solvent control valve 26 (the oxidizer control valve in the preferred form employing the oxidation cleaning technique, described above) is operable to alternate between the introduction of liquid fuel and the introduction of solvent into capillary flow passage 12, enabling the in-situ cleaning of capillary flow passage 12 when the solvent is introduced into capillary flow passage 12. While a wide variety of solvents have utility, the solvent may comprise liquid fuel from the liquid fuel source. When this is the case, no solvent control valve is required, as there is no need to alternate between fuel and solvent, and the heat source should be phased-out over time or deactivated during the cleaning of capillary flow passage 12.

Another embodiment of the present invention is shown in partial cross-section in FIG. 9. A fuel injector 800 having a heated capillary flow passage tube 812 for delivering fuel to an internal combustion engine is shown in FIG. 9. Details of the tube for delivering fuel to an internal combustion engine are illustrated in FIG. 9A. As shown, an axially moveable rod 850 is positioned inside of capillary flow passage 812. The distal end 816 of capillary flow passage 812 is flared and the distal end 852 of axially moveable rod 850 is tapered to form a valve 854 wherein axial movement of the rod 850 opens and closes the valve 854. As may be appreciated, the repeated movement of axially moveable rod 850 is effective for abrading deposits formed during operation of the fuel injector of the present invention.

Referring now to FIG. 10, yet another embodiment of the present invention is shown in partial cross-section. A fuel injector 900 having a heated capillary flow passage tube 912 for delivering fuel to an internal combustion engine is shown in FIG. 10. Details of the tube for delivering fuel to an internal combustion engine are illustrated in FIG. 10A. As shown, an axially moveable rod 950 is positioned inside of capillary flow passage 912. The distal end 916 of capillary flow passage 912 is flared and the distal end 952 of axially moveable rod 950 is tapered to form a valve 954 wherein axial movement of the rod 950 opens and closes the valve 954. Also arranged inside the capillary flow passage 912 are a plurality of brushes 960 arranged along axial moveable rod 950 for cleaning the capillary flow passage 912. As may be appreciated, the repeated movement of axially moveable rod 950 is effective for abrading deposits formed during operation of the fuel injector of the present invention.

Referring now to FIG. 11, another exemplary embodiment of the present invention is shown in partial cross-section. A fuel injector 1000 has multiple capillaries 1012 arranged in parallel for delivering fuel to an internal combustion engine. In this embodiment, fuel will be delivered to the engine by one or more of the capillary flow passages 1012, heated along their length 1020, defined by electrical connections in a manner similar to that as shown in FIG. 1, during specific periods of engine operation (e.g., cold-start, warm-up, and acceleration conditions). As less vaporized fuel is required for reduction of unburned hydrocarbons, heat to one or more capillaries in this configuration can be deactivated.

Figure 12:
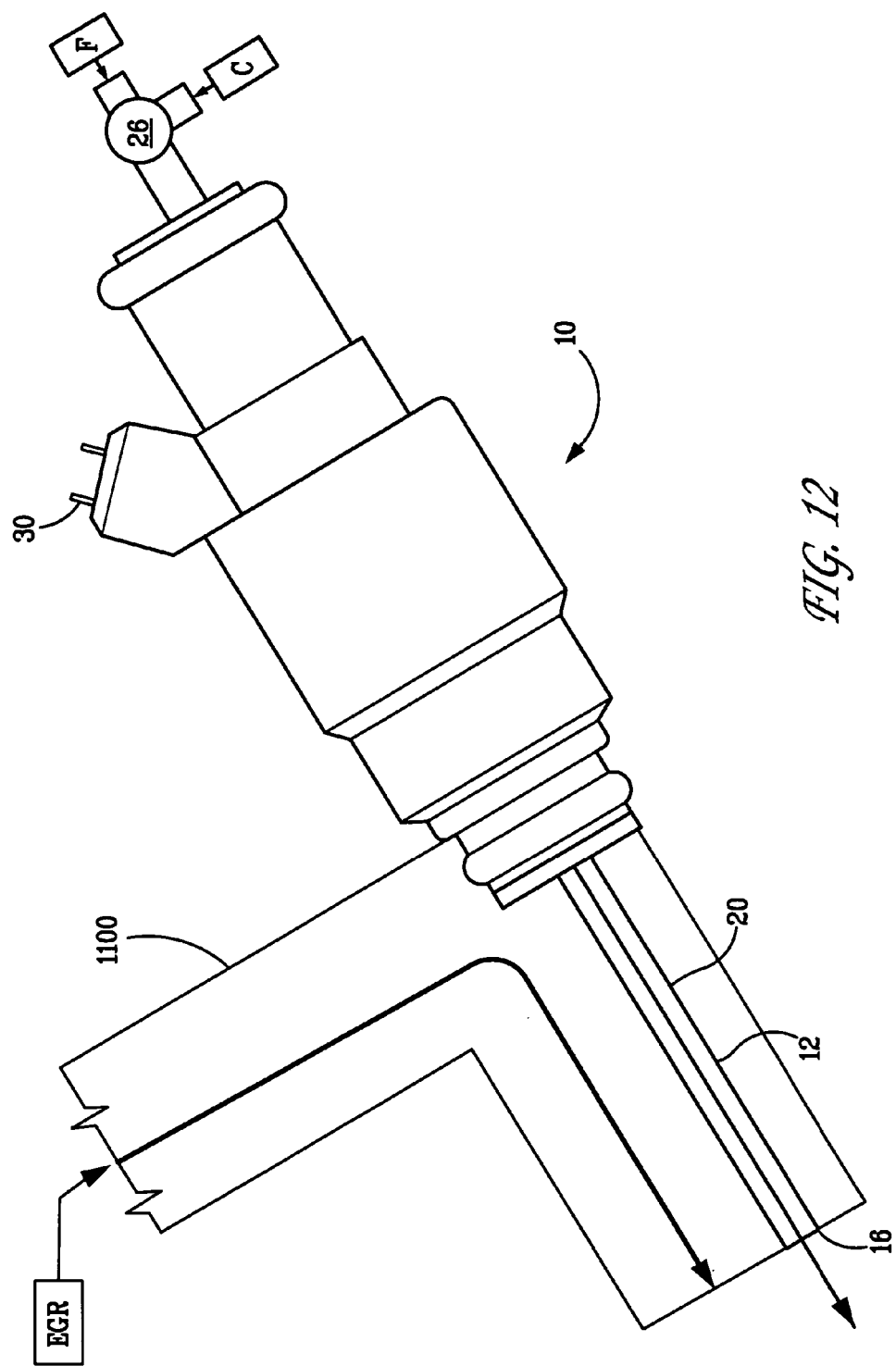
FIG. 12 is a side view of another embodiment of a fuel injector having a capillary passage heated with recirculated exhaust gas.

FIG. 12 shows, in simplified form, how a fuel injector 10, having a capillary flow passage 12 can be arranged so that liquid fuel traveling therethrough can be heated to an elevated temperature through the use of recirculated exhaust gas (EGR) to reduce power requirements of the fuel-vaporizing resistance heater 20. As shown, capillary flow passage 12 passes through EGR passage 1100 for heating. For initial engine start-up, resistance heater 20 comprising a section of the capillary flow passage 12 or a separate resistance heater is connected to a power source such as a battery, to initially vaporize the liquid fuel F. After about 20 seconds of operation the capillary flow passage 12 can be heated by the heat of EGR to reduce the power otherwise needed for continued vaporization of the fuel by the resistance heater 20. Thus, the fuel in the capillary flow passage 12 can be vaporized without using the resistance heater 20 so that power can be conserved.

Figure 13:
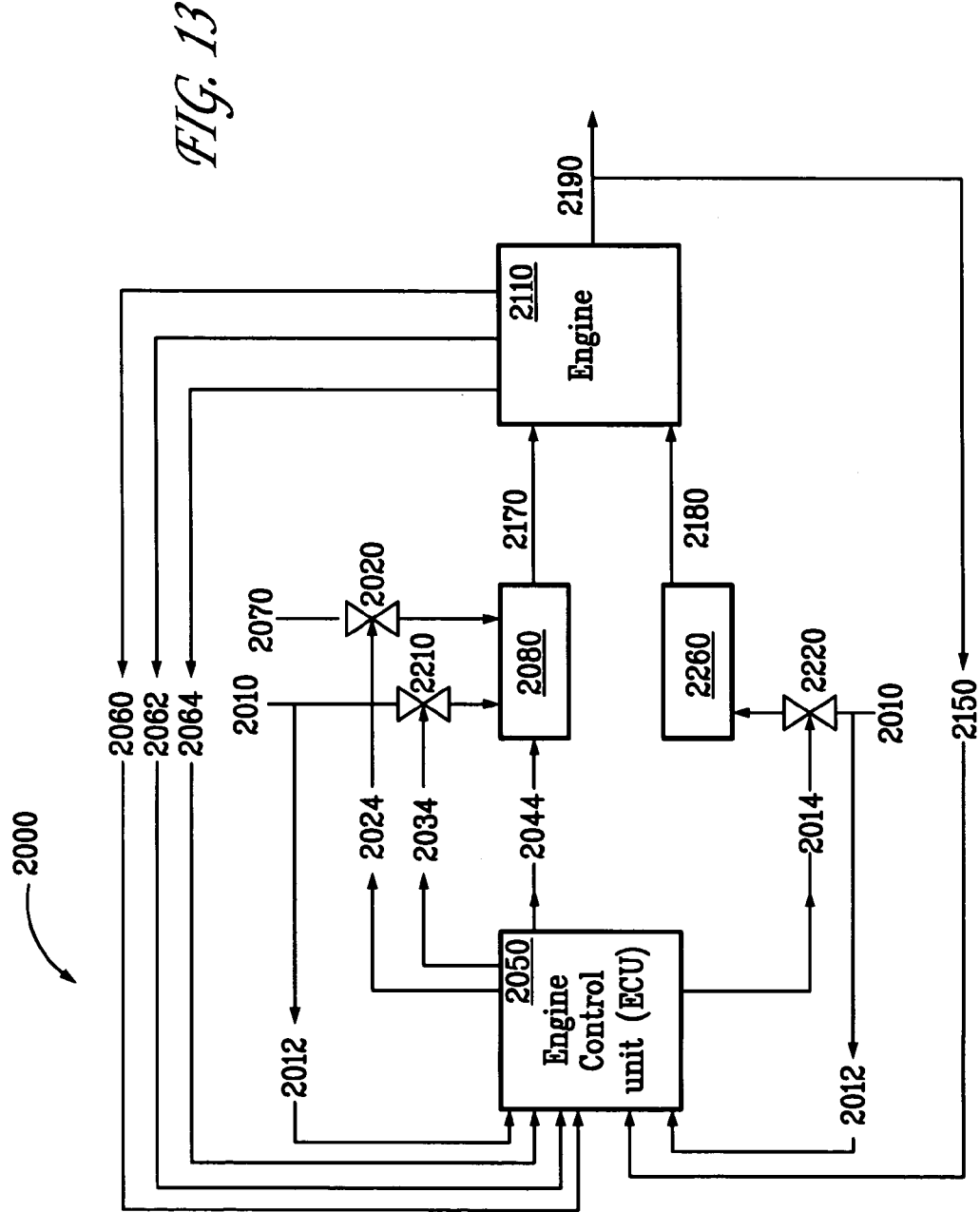
FIG. 13 is a schematic of a fuel delivery and control system, in accordance with a preferred form.

FIG. 13 shows an exemplary schematic of a control system 2000 used to operate an internal combustion engine 2110 incorporating a liquid fuel supply valve 2220 in fluid communication with a liquid fuel supply 2010 and a liquid fuel injection path 2260, a vaporized fuel supply valve 2210 in fluid communication with a liquid fuel supply 2010 and capillary flow passages 2080, and an oxidizing gas supply valve 2020 in fluid communication with an oxidizing gas supply 2070 and capillary flow passages 2080. The control system includes a controller 2050 which typically receives a plurality of input signals from a variety of engine sensors such as engine speed sensor 2060, intake manifold air thermocouple 2062, coolant temperature sensor 2064, exhaust air-fuel ratio sensor 2150, fuel supply pressure 2012, etc. In operation, the controller 2050 executes a control algorithm based on one or more input signals and subsequently generates an output signal 2024 to the oxidizer supply valve 2020 for cleaning clogged capillary passages in accordance with the invention, an output signal 2014 to the liquid fuel supply valve 2220, an output signal 2034 to the vaporized fuel supply valve 2210, and a heating power command 2044 to a power supply which delivers power to heat to the capillaries 2080.

In operation, the system according to the invention can be configured to feed back heat produced during combustion through the use of exhaust gas recycle heating, such that the liquid fuel is heated sufficiently to substantially vaporize the liquid fuel as it passes through the capillary flow passages 2080 reducing or eliminating or supplementing the need to electrically or otherwise heat the capillary flow passages 2080.

EXAMPLES

Example 1

Tests were performed wherein JP 8 jet fuel was vaporized by supplying the fuel to a heated capillary flow passage at constant pressure with a micro-diaphragm pump system. In these tests, capillary tubes of different diameters and lengths were used. The tubes were constructed of 304 stainless steel having lengths of 1 to 3 inches and internal diameters (ID) and outer diameters (OD), in inches, as follows: 0.010 ID/0.018 OD, 0.013 ID/0.033 OD, and 0.017 ID/0.025 OD. Heat for vaporizing the liquid fuel was generated by passing electrical current through a portion of the metal tube. The droplet size distribution was measured using a Spray-Tech laser diffraction system manufactured by Malvern. Droplets having a Sauter Mean Diameter (SMD) of between 1.7 and 4.0 μm were produced. SMD is the diameter of a droplet whose surface-to-volume ratio is equal to that of the entire spray and relates to the spray's mass transfer characteristics.

Example 2

Tests were performed again using gasoline which was vaporized by supplying the fuel to a heated capillary flow passage at constant pressure with a micro-diaphragm pump system. In these tests, capillary flow passages of different diameters and lengths were used. The following table shows empirical findings for various capillary tube configurations.

| Internal Diameter in. | Heated Length in. | Fuel Pressure psig. | Results |
| --- | --- | --- | --- |
| 0.027 | 6.75 | 75 | Generated fully vaporized flow and flow rate of 180 mg/s |
| 0.029 | 7.25 | 65 | Generated high flow rates with a heating voltage of 20 V. |
| 0.020 | 6.0 | 70 | Generated at least 200 mg/s flow rate with substantially adequate vapor characteristics. |

Example 3

In tests using a Ford 4.6 liter V8 engine, one bank of four cylinders was modified to include fuel delivery devices of the invention as shown in FIG. 1. The capillary heating elements were mounted with the tip of the capillary positioned flush with the intake port wall, this being the location of the stock fuel injection nozzle. The tests were carried out with continuous injection (100% duty cycle) and, therefore, fuel pressure was used to regulate the fuel vapor flow rate.

Figure 14:
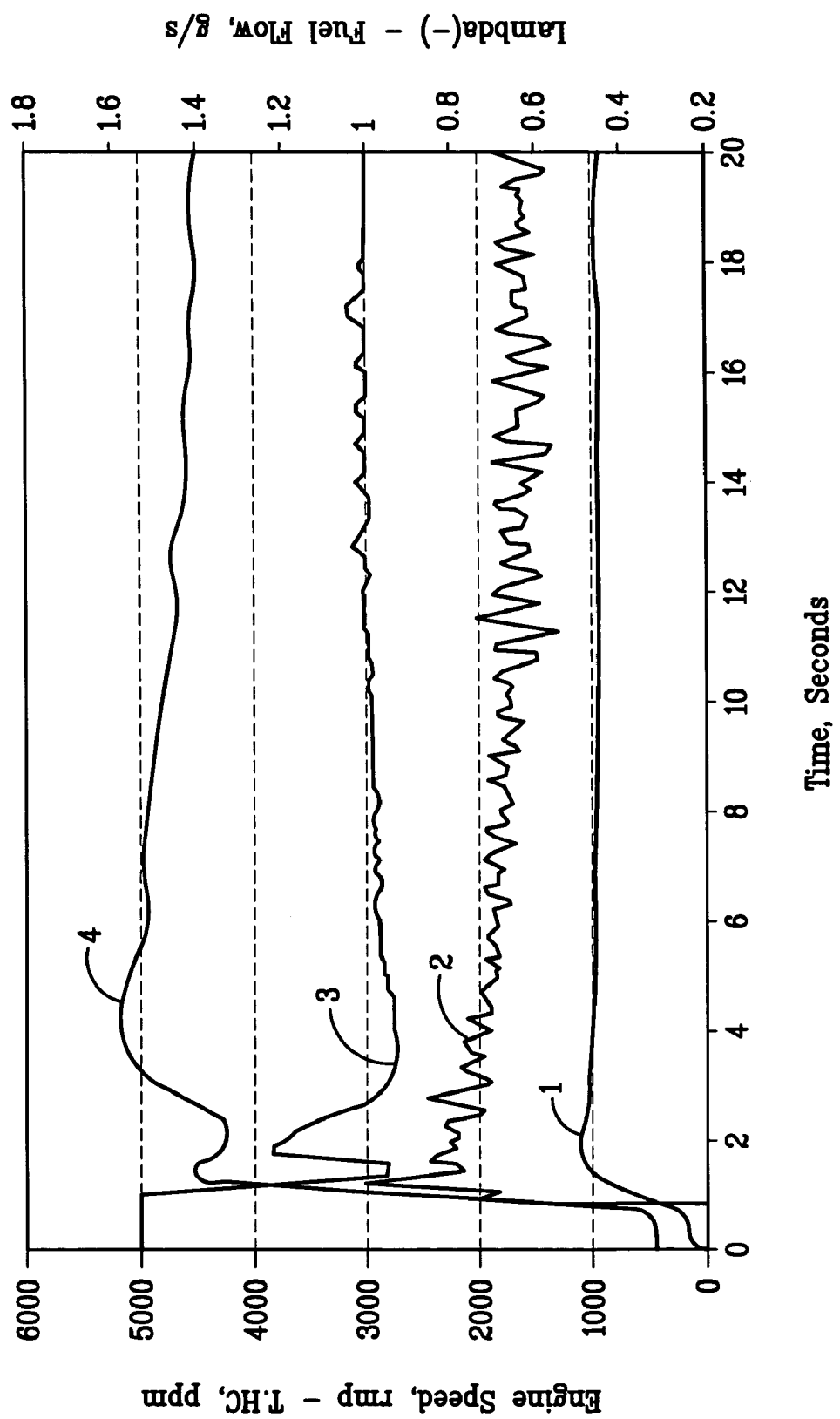
FIG. 14 is a chart illustrating engine parameters during the first 20 seconds of starting in engine using the fuel delivery device of the invention.

Referring to FIG. 14, a graph illustrating results of the capillary fuel delivery device during the first 20 seconds of cold start of an engine is presented. Plot line 1 represents the engine speed, in revolutions per minute, as time progresses along the x-axis. Plot line 2 represents the fuel flow, in grams per second, as time progresses along the x-axis. Plot line 3 represents lambda as time progresses along the x-axis, wherein a lambda of unity represents the stoichiometric ratio of air to fuel. Plot line 4 represents the total hydrocarbon emissions output, in methane equivalent parts per million, from the exhaust of the engine as time progresses along the x-axis.

Figure 15:
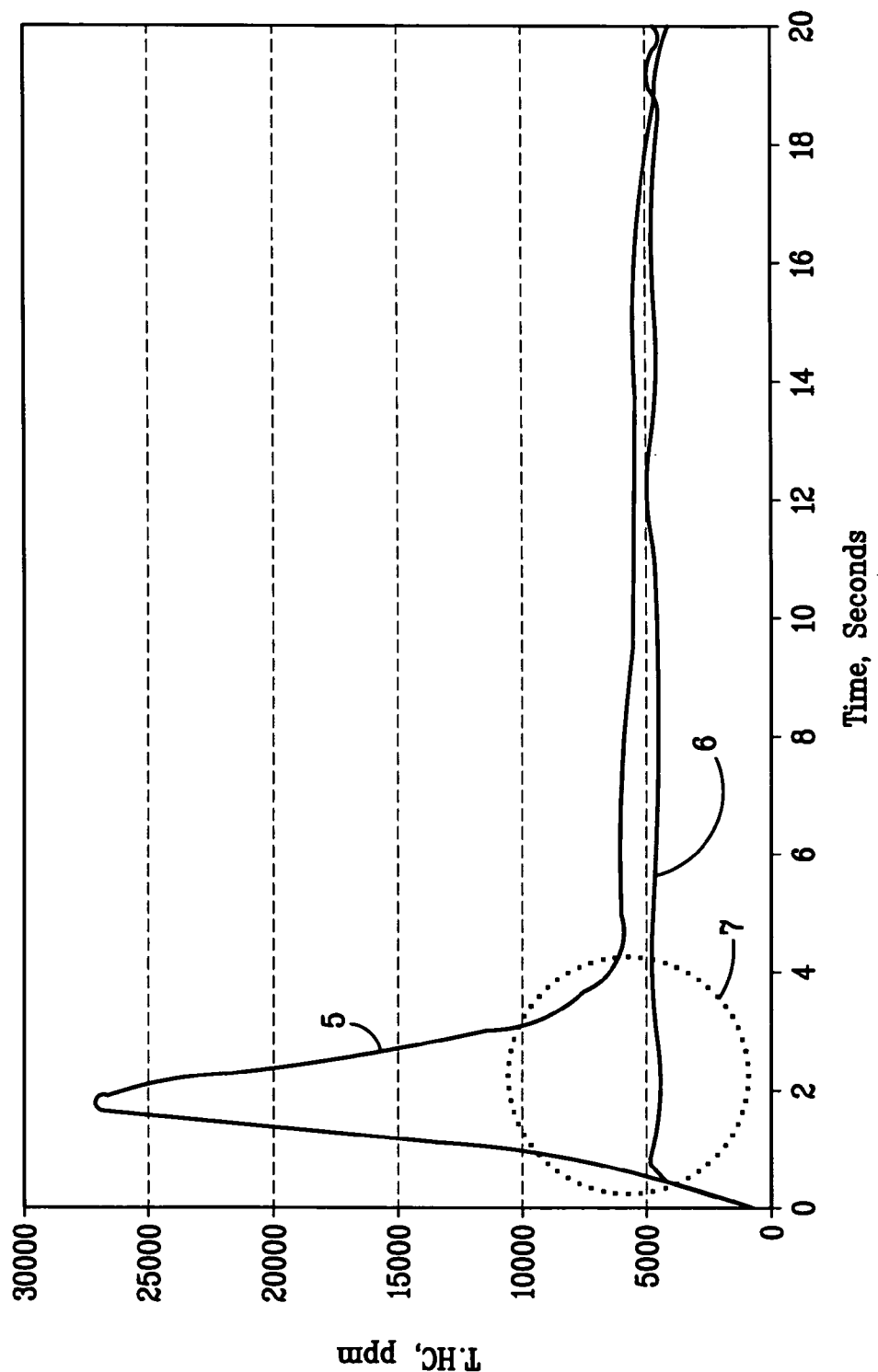
FIG. 15 is a chart illustrating a comparison of engine emissions from the fuel delivery device of the invention with conventional port-fuel injectors.

As illustrated by plot line 3 in FIG. 14, the initial over-fueling required for the stock engine hardware and control strategy was eliminated through the use of the fuel delivery device of the invention. That is, the fuel delivery device of the invention efficiently vaporized liquid fuel during the initial start-up period such that the engine was started with a near-stoichiometric fuel/air ratio. FIG. 15 is a graph which illustrates the emission reduction resulting from the near-stoichiometric start achieved with the fuel delivery device of the invention (plot line 6) compared to the conventional over-fueling start-up strategy (plot line 5). Specifically, the results in FIG. 15 demonstrate that the fuel delivery device of the invention reduced integrated hydrocarbon emissions by 46% during the first ten seconds of cold-start as compared to the stock configuration, which requires over-fueling. The area indicated by circle 7 illustrates the dramatic reduction of hydrocarbon emissions during the first four seconds of starting the engine.

Example 4

Tests were conducted to demonstrate the benefits of the oxidation cleaning technique on a heated capillary flow passage using an unadditized, sulfur-free base gasoline known to produce high levels of deposit formation. The capillary flow passage employed for these tests was a two-inch long heated capillary tube constructed of stainless steel, having an inner diameter of 0.023 inch. Fuel pressure was maintained at 10 psig. Power was supplied to the capillary to achieve various levels of $R/R_o$; where R is the heated capillary resistance and $R_o$ is the capillary resistance under ambient conditions.

Figure 16:
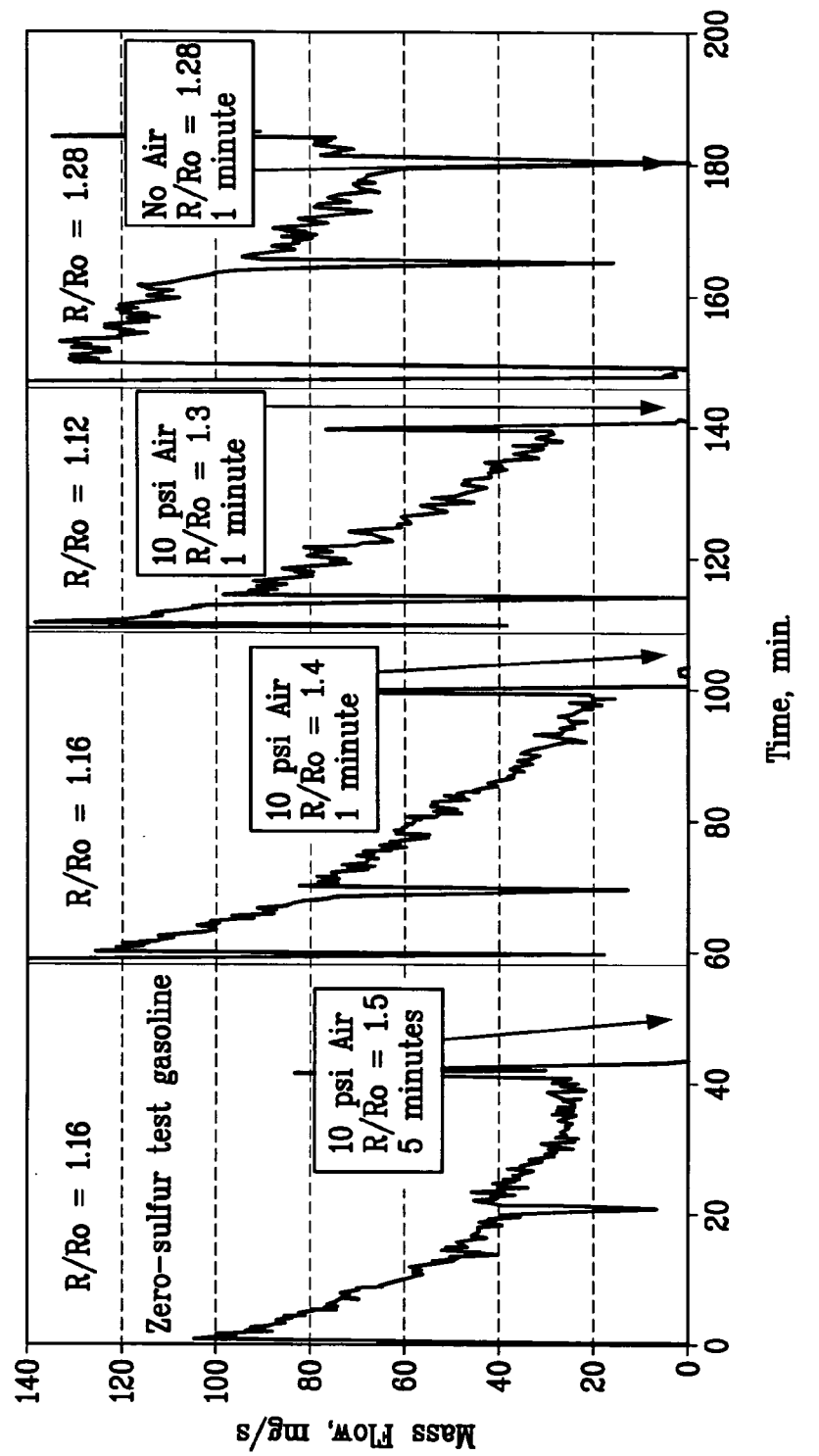
FIG. 16 is a graph of gasoline mass flow as a function of time showing the benefit to operation achieved through the use of the oxidation cleaning method of the present invention.

FIG. 16 presents a graph of fuel flow rate vs. time. As shown, for this gasoline containing no detergent additive, significant clogging was experienced in a very short period of time, with a 50% loss in flow rate observed in as little as 10 minutes.

After substantial clogging was experienced, fuel flow was discontinued and air at 10 psig substituted. Heating was provided during this period and, in as little as one minute later, significant cleaning was achieved, with flow rates returning to prior levels.

Example 5

Figure 17:
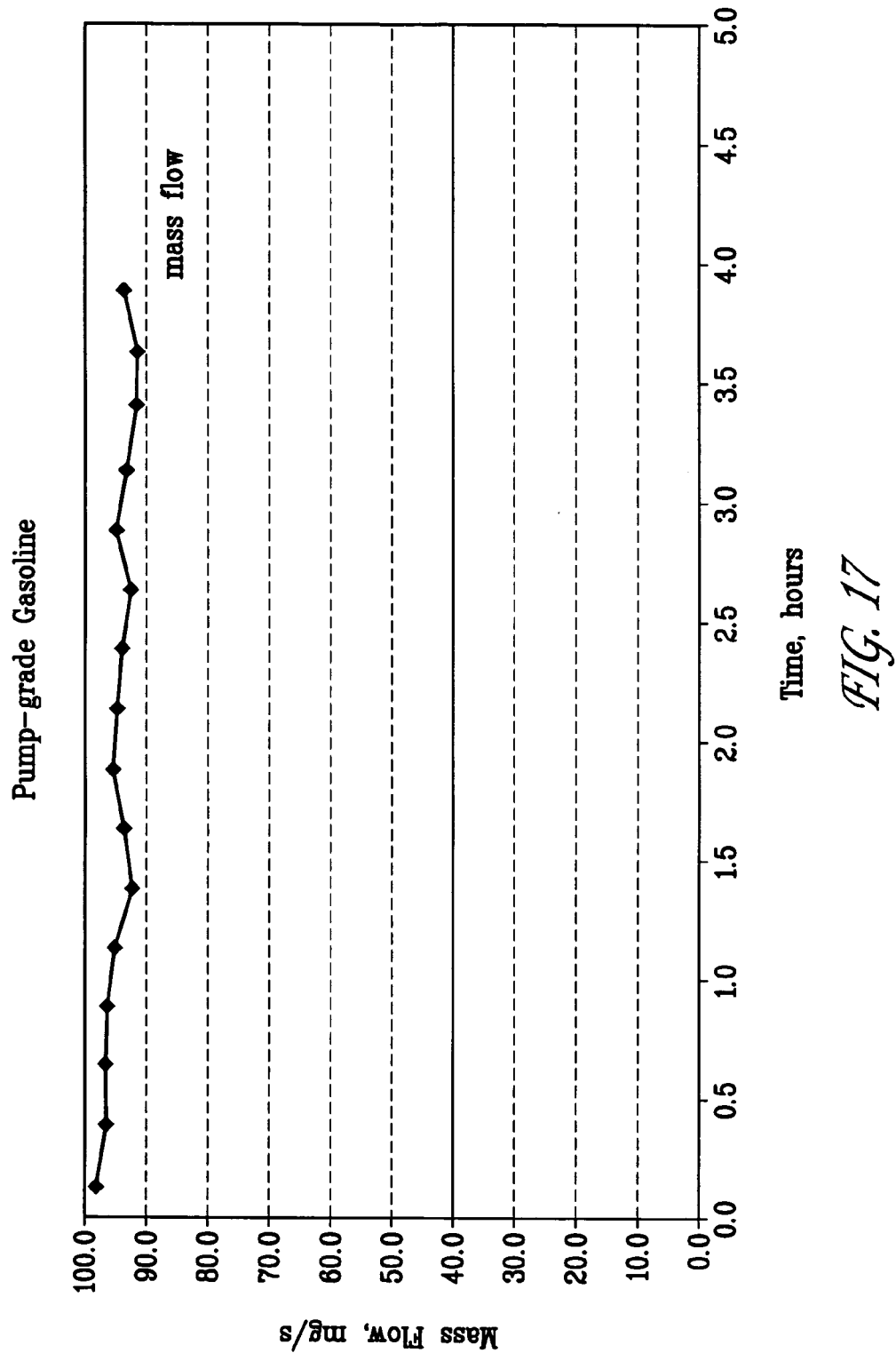
FIG. 17 is a graph of fuel flow rate vs. time for a commercial-grade gasoline.

This example demonstrates that clogging is far less severe in the heated capillary flow passage of Example 4, when a commercial-grade gasoline employing an effective additive package is employed. As shown in FIG. 17, less than a 10% reduction in fuel flow rate was experienced after running the device for nearly four hours.

Example 6

To compare various gasolines and the impact of detergent additives on clogging, five test fuels were run in the heated capillary flow passage of Example 4. The fuels tested included an unadditized base gasoline containing 300 ppm sulfur, an unadditized base gasoline containing no sulfur, the sulfur-free base gasoline with a commercially available after-market additive (additive A) added and the sulfur-free base gasoline with another commercially available after-market additive (additive B) added.

Figure 18:
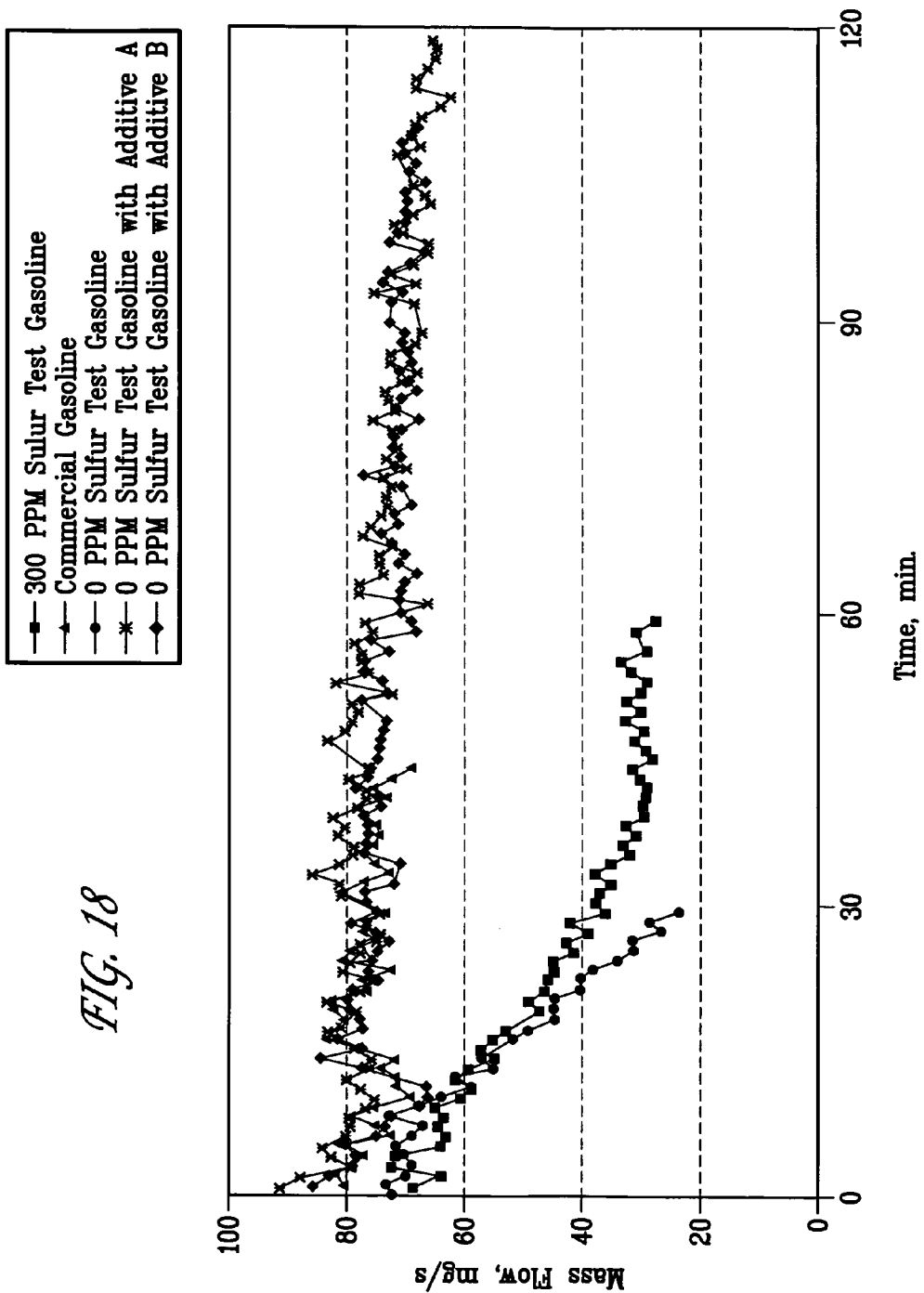
FIG. 18 presents a graph of fuel flow rate vs. time comparing various gasolines.

As shown in FIG. 18, the additized fuels performed similarly, while unadditized fuels experienced severe clogging in less than one hour of operation.

Example 7

This example compares the operation over time of a capillary flow passage operating on an unadditized jet fuel (JP-8) to the same capillary flow passage operating on an unadditized No. 2 diesel fuel operated in a capillary flow passage having an I D. of 0.014 inch and a two inch length. Fuel pressure was set to 15 psig. Power was supplied to the capillary to achieve a level of $R/R_o$ of 1.19; where R is the heated capillary resistance and $R_o$ is the capillary resistance under ambient conditions.

Figure 19:
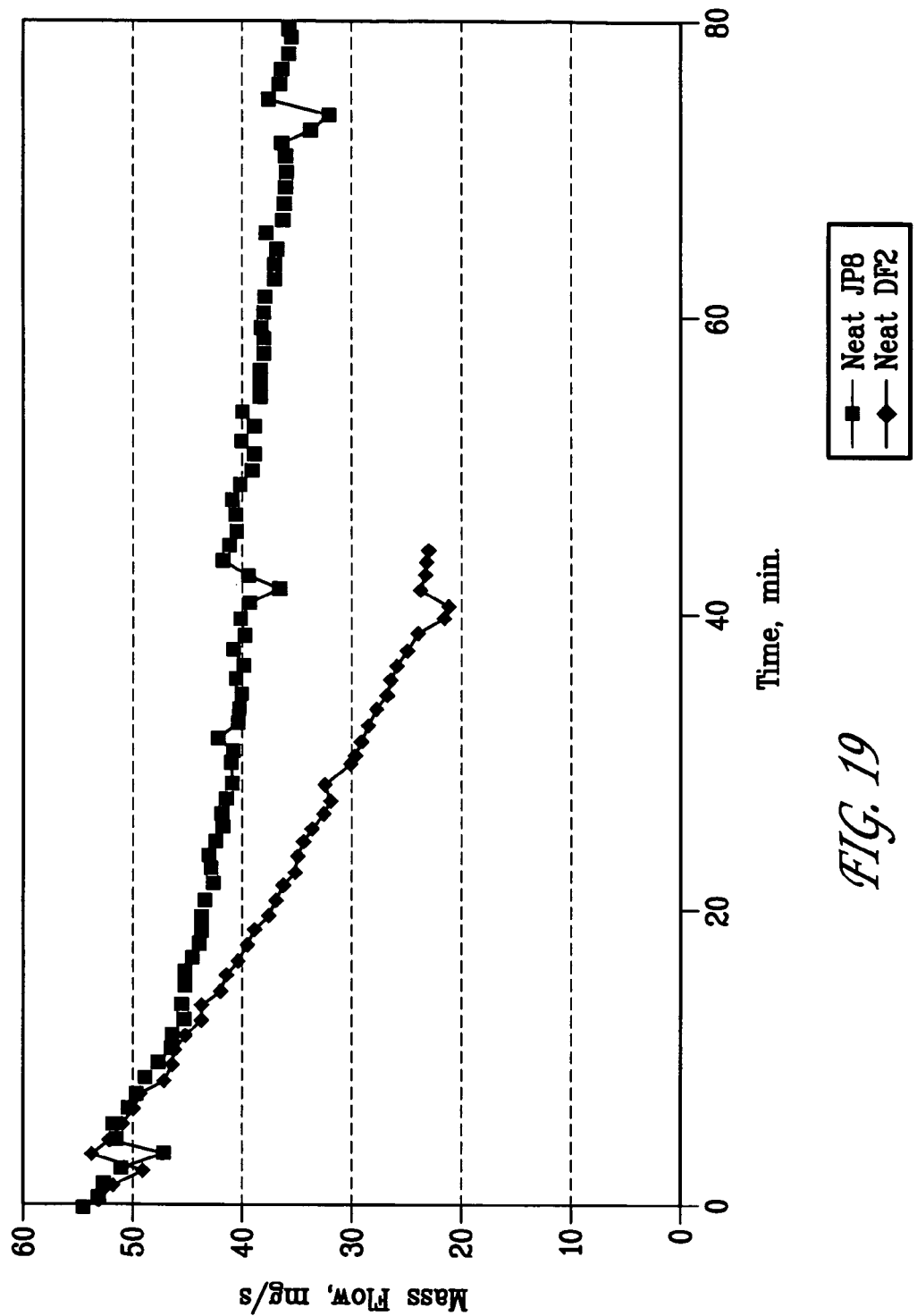
FIG. 19 is a graph of fuel flow rate vs. time comparing a jet fuel to a No. 2 diesel fuel.

As shown in FIG. 19, the fuels performed similarly over the first ten minutes of operation, with the diesel fuel suffering more severe clogging thereafter.

Example 8

Tests were conducted to assess the efficacy of the oxidation cleaning technique on a heated capillary flow passage using an unadditized, No. 2 diesel fuel known to produce high levels of deposit formation. The capillary flow passage employed for these tests was a two-inch long heated capillary tube constructed of stainless steel, having an inner diameter of 0.014 inch. Fuel pressure was maintained at 15 psig. Power was supplied to the capillary to achieve a level of $R/R_o$ of 1.19; where R, once again, is the heated capillary resistance and $R_o$ is the capillary resistance under ambient conditions.

Figure 20:
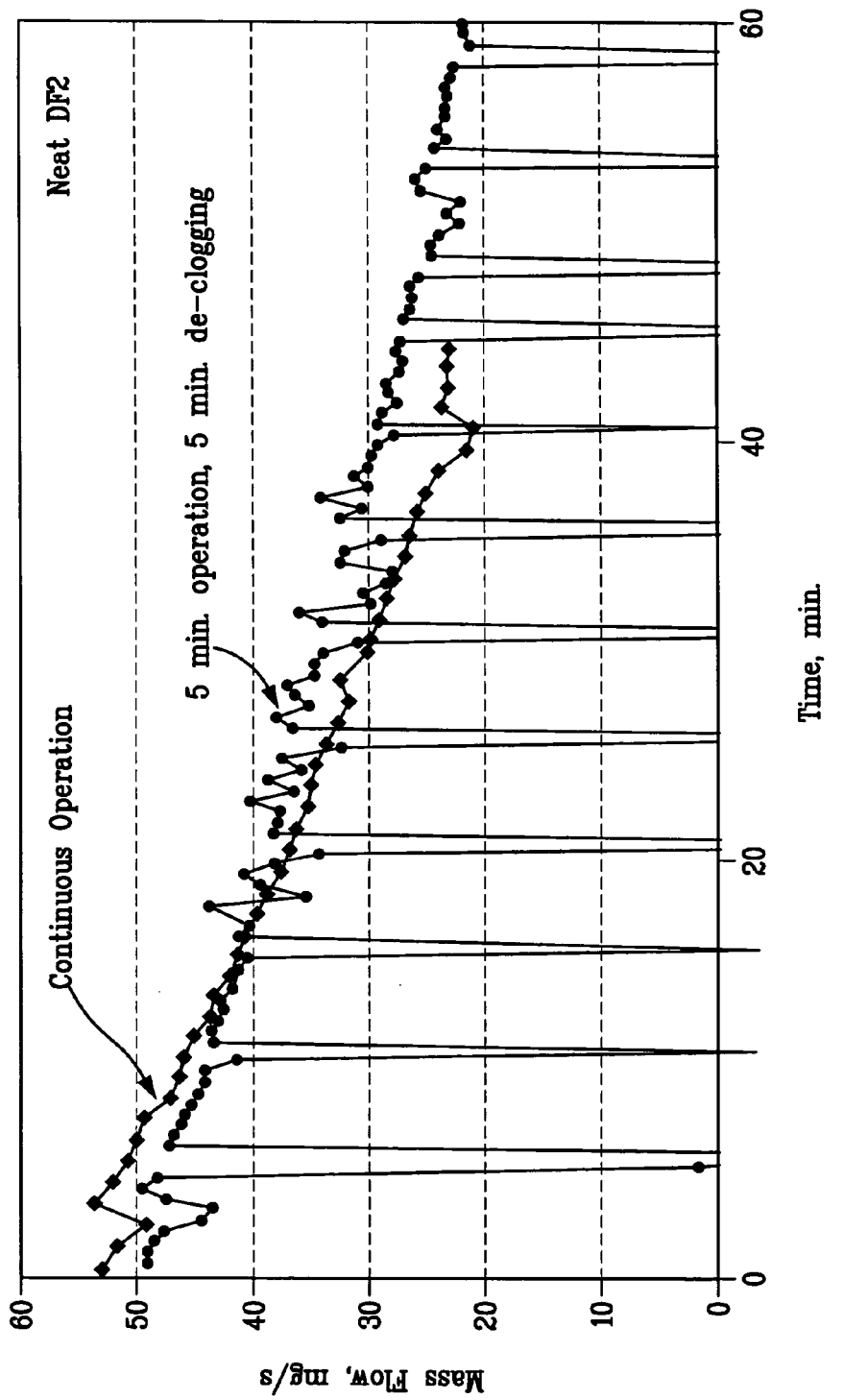
FIG. 20 presents a graph of fuel flow rate vs. time for an unadditized diesel fuel showing the effect of oxidation cleaning.

FIG. 20 presents a graph of fuel flow rate vs. time. As shown, for this fuel containing no detergent additive, significant clogging was experienced in a very short period of time, with a 50% loss in flow rate observed in about 35 minutes of continuous operation.

In a second run, after five minutes of operation, fuel flow was discontinued and air at 10 psig substituted for a period of five minutes. Heating was also provided during this period. This procedure was repeated every five minutes. As shown in FIG. 20, the oxidation cleaning process increased fuel flow rate in virtually every instance and tended to slow the overall decline in fuel flow rate over time. However, the efficacy of the process was somewhat less than was achieved using an unadditized gasoline, as described in Example 4.

Example 9

Tests were conducted to assess the effect of a commercial grade anti-fouling detergent additive blended with the No. 2 diesel fuel of Example 8 on fuel flow rate over time in a heated capillary flow passage. The capillary flow passage employed for these tests, once again, was a two-inch long heated capillary tube constructed of stainless steel, having an inner diameter of 0.014 inch. Fuel pressure was maintained at 15 psig and power was supplied to the capillary to achieve a level of $R/R_o$ of 1.19.

Figure 21:
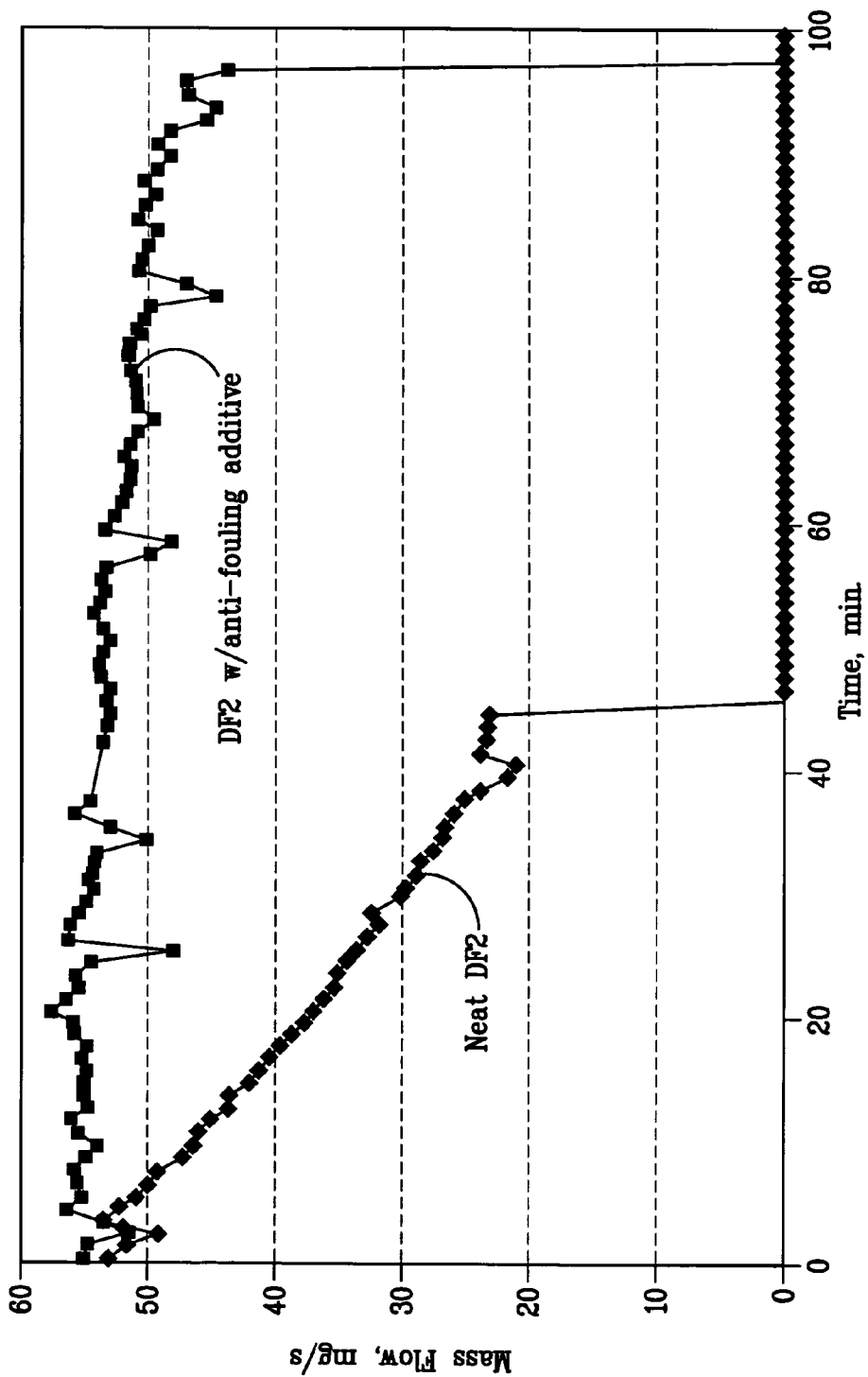
FIG. 21 is a graph of fuel flow rate vs. time comparing an unadditized diesel fuel to a diesel fuel containing an anti-fouling additive.

FIG. 21 presents a comparison of fuel flow rate vs. time for the additized No. 2 diesel fuel and an unadditized diesel fuel. As shown, for the fuel containing no detergent additive, significant clogging was experienced in a very short period of time, with a 50% loss in flow rate observed in about 35 minutes of continuous operation, while the same base fuel containing the detergent showed far less clogging over an extended period of time.

While the subject invention has been illustrated and described in detail in the drawings and foregoing description, the disclosed embodiments are illustrative and not restrictive in character. All changes and modifications that come within the scope of the invention are desired to be protected. As an example, a plurality of capillary passages can be provided, with the fuel being passed through the passages in parallel when a higher volume flow rate is desired.

What is claimed is:

1. A fuel injector for vaporizing a liquid fuel for use in an internal combustion engine, comprising:
   (a) a plurality of capillary flow passages, each of said plurality of capillary flow passages having an inlet end and an outlet end;
   (b) a fluid control valve for placing said inlet end of each of said plurality of capillary flow passages in fluid communication with the liquid fuel source and introducing the liquid fuel in a substantially liquid state;
   (c) a heat source arranged along each of said plurality of capillary flow passages, said heat source operable to heat the liquid fuel in said plurality of capillary flow passages to a level sufficient to change from the liquid state to a vapor state and deliver a stream of vaporized fuel from said outlet end of each of said plurality of capillary flow passages; and
   (d) means for cleaning deposits formed during operation of the apparatus
   wherein said means for cleaning deposits includes said fluid control valve, said fluid control valve operable for placing each of said plurality of capillary flow passages in fluid communication with a solvent, enabling in-situ cleaning of said plurality of capillary flow passages when the solvent is introduced into said capillary flow passages.

2. The fuel injector of claim 1, wherein said means for cleaning deposits further includes a solvent control valve for placing each of said plurality of capillary flow passages in fluid communication with a solvent, and wherein said solvent control valve for placing each of said plurality of capillary flow passages in fluid communication with a solvent is operable to alternate between the introduction of liquid fuel and the introduction of solvent into each of said capillary flow passages and enable in-situ cleaning when the solvent is introduced into said plurality of capillary flow passages.

3. The fuel injector of claim 1, wherein the solvent comprises liquid fuel from the liquid fuel source and wherein the heat source is phased-out during cleaning of said capillary flow passage.

4. The fuel injector of claim 1, further including a solenoid to actuate said fluid control valve for placing said inlet end in fluid communication with the liquid fuel supply.

5. The fuel injector of claim 1, wherein said heat source includes a resistance heater.

6. A fuel system for use in an internal combustion engine, comprising
   (a) a plurality of fuel injectors, each injector including (i) a plurality of capillary flow passages, each of said plurality of capillary flow passages having an inlet end and an outlet end; (ii) a fluid control valve for placing said inlet end of each of said plurality of capillary flow passages in fluid communication with the liquid fuel source and introducing the liquid fuel in a substantially liquid state; and (iii) a heat source arranged along each of the said plurality of capillary flow passages, each said heat source operable to heat the liquid fuel in each of said plurality of capillary flow passages to a level sufficient to change from the liquid state to a vapor state and deliver a stream of vaporized fuel from each said outlet end of each of said plurality of capillary flow passages;
   (b) a liquid fuel supply system in fluid communication with said plurality of fuel injectors; and
   (c) a controller to control the supply of fuel to said plurality of fuel injectors.

7. The fuel system of claim 6, further comprising means for cleaning deposits formed during operation of the apparatus.

8. The fuel system of claim 7, wherein said means for cleaning deposits includes said fluid control valve, said heat source and an oxidizer control valve for placing each of said plurality of capillary flow passages in fluid communication with an oxidizer, said heat source also being operable to heat the oxidizer in each of said plurality of capillary flow passages to a level sufficient to oxidize deposits formed during the heating of the liquid fuel, wherein said oxidizer control valve for placing each of said plurality of capillary flow passages in fluid communication with an oxidizer is operable to alternate between the introduction of liquid fuel and the introduction of oxidizer into said capillary flow passages and enable in-situ cleaning of said capillary flow passages when the oxidizer is introduced into each of said plurality of capillary flow passages.

9. The fuel system of claim 8, wherein the oxidizer comprises air, exhaust gas, steam and mixtures thereof.

10. The fuel system of claim 7, wherein said means for cleaning deposits includes said fluid control valve and a solvent control valve for placing said at least one capillary flow passage in fluid communication with a solvent, and wherein said solvent control valve for placing each of said plurality of capillary flow passages in fluid communication with a solvent is operable to alternate between the introduction of liquid fuel and the introduction of solvent into said capillary flow passages and enable in-situ cleaning of said capillary flow passages when the solvent is introduced into each of said plurality of capillary flow passages.

11. The fuel system of claim 7, wherein said means for cleaning deposits includes said fluid control valve, said fluid control valve operable for placing each of said plurality of capillary flow passages in fluid communication with a solvent, enabling in-situ cleaning of said capillary flow passage when the solvent is introduced into said at least one capillary flow passage.

12. The fuel system of claim 11, wherein the solvent comprises liquid fuel from the liquid fuel source and wherein the heat source is phased-out during cleaning of said plurality of capillary flow passages.

13. The fuel system of claim 6, wherein under cold starting conditions each of said plurality of capillary flow passages delivers vaporized fuel, which condenses in air at ambient temperature to form an aerosol.

14. A method of delivering fuel to an internal combustion engine, comprising the steps of:
(a) supplying liquid fuel to a plurality of capillary flow passages of a fuel injector;

(b) causing a stream of vaporized fuel to pass through an outlet of each of the plurality of capillary flow passages by heating the liquid fuel in each of the plurality of capillary flow passages; and (c) delivering the vaporized fuel to a combustion chamber of the internal combustion engine.

15. The method of claim 14, wherein said delivery of vaporized fuel to the combustion chamber of the internal combustion engine is limited to start-up and warm-up of the internal combustion engine.

16. The method of claim 15, wherein a stream of vaporized fuel is delivered to each combustion chamber of the internal combustion engine.

17. The method of claim 14, wherein a stream of vaporized fuel is delivered to each combustion chamber of the internal combustion engine.

18. The method of claim 15, further comprising delivering liquid fuel to the combustion chamber of the internal combustion engine when the internal combustion engine is at a fully warmed condition.

19. The method of claim 14, further comprising cleaning periodically each of the plurality of capillary flow passages.

20. The method of claim 19, wherein said periodic cleaning comprises (i) phasing-out said heating of the plurality of capillary flow passages, (ii) supplying a solvent to the plurality of capillary flow passages, whereby deposits formed in the plurality of capillary flow passages are removed.

21. The method of claim 20, wherein the solvent includes liquid fuel from the liquid fuel source.

22. The method of claim 14, wherein the stream of vaporized fuel mixes with air and forms an aerosol in the combustion chamber prior to start up of combustion, the method including forming the aerosol with a particle size distribution, a fraction of which is 25 μm or less prior to igniting the vaporized fuel to initiate combustion.

23. A fuel injector for vaporizing a liquid fuel for use in an internal combustion engine, comprising:

(a) a plurality of capillary flow passages, each of said plurality of capillary flow passages having an inlet end and an outlet end;

(b) a fluid control valve for controlling flow from said outlet end of each of said plurality of capillary flow passages; and (c) a heat source arranged along each of said plurality of capillary flow passages, said heat source operable to heat the liquid fuel in said plurality of capillary flow passages to a level sufficient to change from the liquid state to a vapor state and deliver a stream of vaporized fuel from said outlet end of each of said plurality of capillary flow passages.

* * * * *